United States Patent [19]
Uchiyama

[11] Patent Number: 5,701,246
[45] Date of Patent: Dec. 23, 1997

[54] SUSPENSION CONTROL APPARATUS

[75] Inventor: Masaaki Uchiyama, Kanagawa-ken, Japan

[73] Assignee: Tokico Ltd., Kawasaki, Japan

[21] Appl. No.: 405,873

[22] Filed: Mar. 17, 1995

[30] Foreign Application Priority Data

Mar. 18, 1994 [JP] Japan .................................. 6-074470

[51] Int. Cl.$^6$ ................................................ B60G 17/01
[52] U.S. Cl. ........................... 364/424.047; 364/424.046; 280/707
[58] Field of Search ...................... 364/424.05, 424.046, 364/424.047; 280/707, 840, 6.1

[56] References Cited

U.S. PATENT DOCUMENTS

| | | | |
|---|---|---|---|
| 5,033,770 | 7/1991 | Kamimura et al. | 364/424.05 |
| 5,063,512 | 11/1991 | Kamimura et al. | 364/424.05 |
| 5,103,396 | 4/1992 | Kiwatashi et al. | 364/424.05 |
| 5,174,598 | 12/1992 | Sato et al. | 364/424.05 |
| 5,400,245 | 3/1995 | Butsuen et al. | 364/424.05 |
| 5,446,663 | 8/1995 | Sasaki et al. | 364/424.05 |

FOREIGN PATENT DOCUMENTS 40 40 376  6/1991  Germany .

*Primary Examiner*—Vincent N. Trans
*Attorney, Agent, or Firm*—Wenderoth, Lind & Ponack

[57] ABSTRACT

The present invention provides a suspension control apparatus for a vehicle ensuring good comfort regardless of a waving road surface condition. A control signal adjusting portion sends a control signal for decreasing a damping coefficient for an extension side to a control signal emitting portion when an absolute value of downward acceleration of sprung mass exceeds a sprung mass acceleration reference value. When the vehicle reaches the top of an undulation and the absolute value of the downward acceleration of the sprung mass exceeds the sprung mass acceleration reference value, the control signal adjusting portion sends the control signal for decreasing a damping coefficient for the extension side to the control signal emitting portion so that a shock absorber of variable damping coefficient type can easily be displaced toward the extension side. Thus, relative displacement between a vehicle wheel and a vehicle body can easily be achieved toward the extension side, thereby suppressing the downward acceleration of the vehicle body. Consequently, the driver and passenger(s) do not feel bad because they do not feel as if they are thrown upwardly.

6 Claims, 34 Drawing Sheets

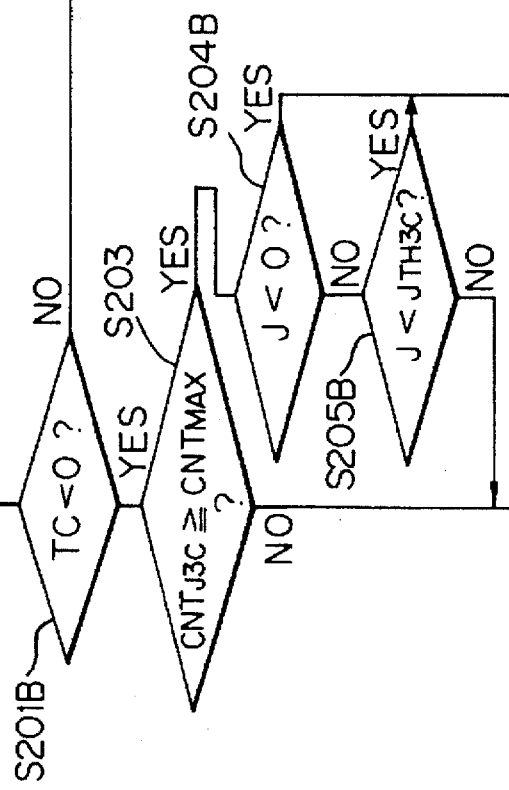

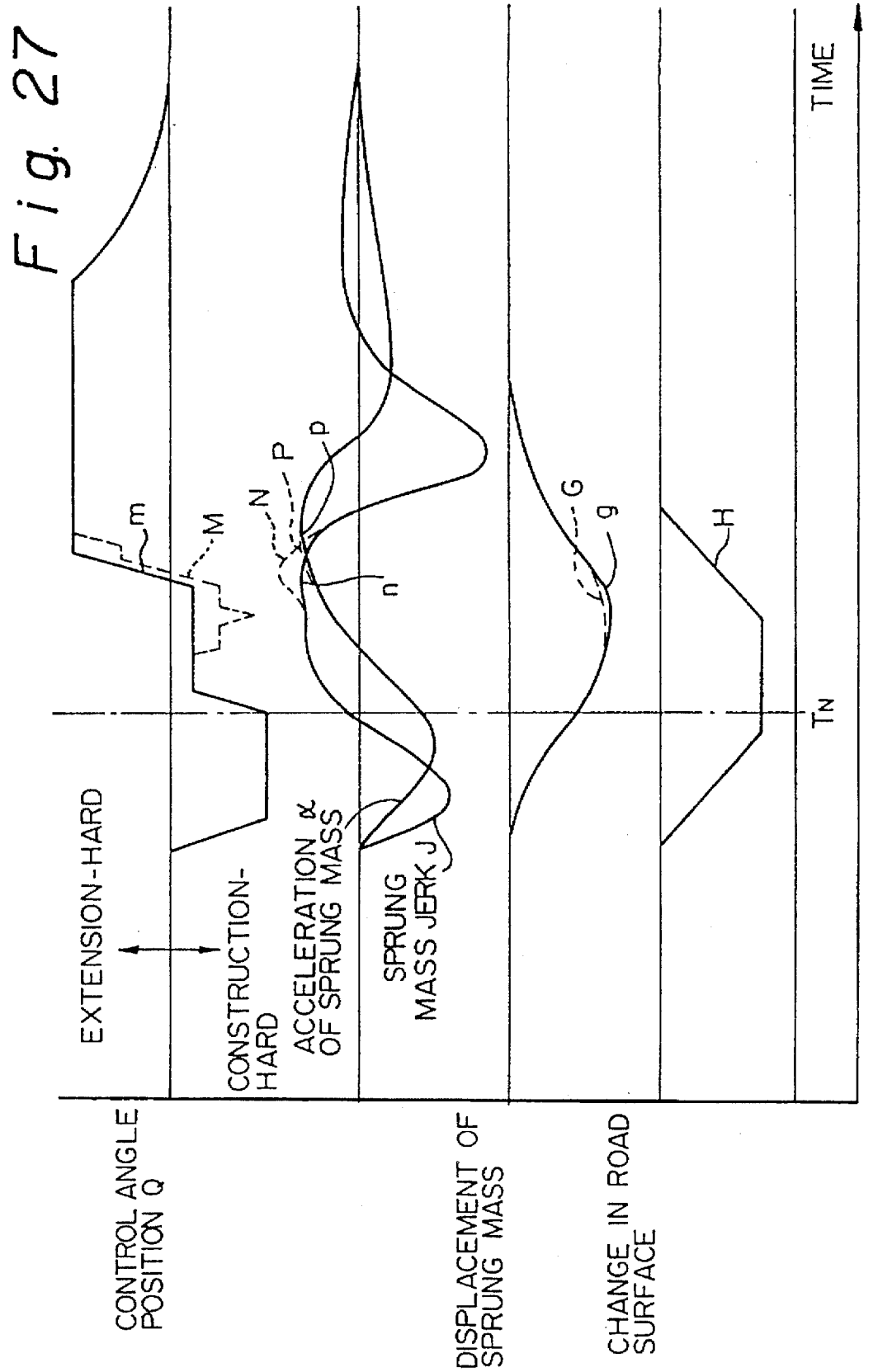

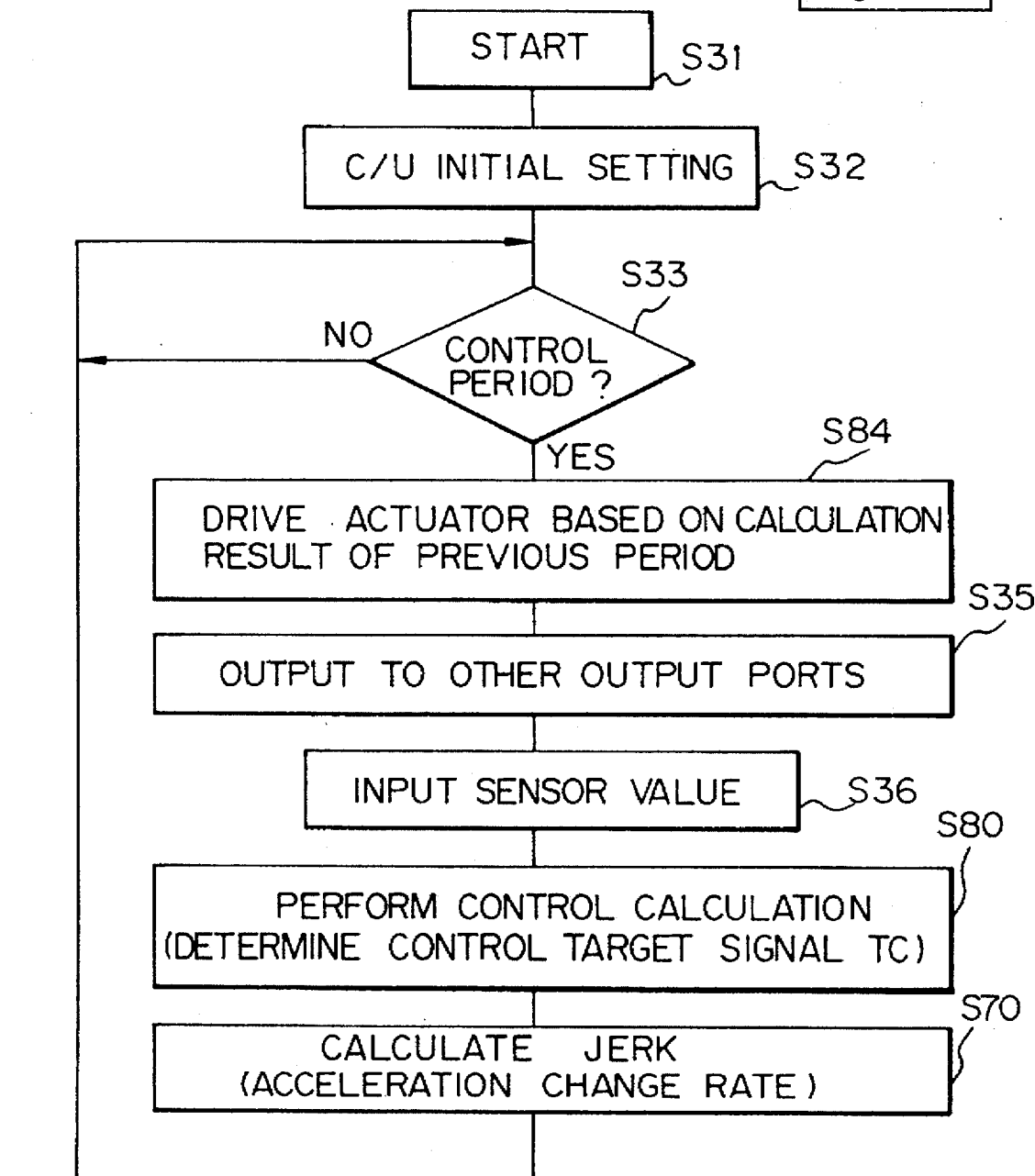

SUSPENSION CONTROL APPARATUS

BACKGROUND OF THE INVENTION

1. Field of the Invention

The present invention relates to a suspension control apparatus.

2. Related Background Art

An example of a conventional suspension control apparatus is disclosed in the Japanese Patent Application Laid-open No. Hei 5-330325 (1993). Such a conventional suspension control apparatus comprises a shock absorber of variable damping coefficient type disposed between a sprung mass and an unsprung mass of a vehicle. An actuator sets and adjusts a damping coefficient of the shock absorber and is of a variable damping coefficient type. An acceleration sensor detects an upward acceleration and a downward acceleration of the vehicle. An integration means for integrates a signal from the acceleration sensor to obtain an upward absolute velocity or a downward absolute velocity. A correction value calculating means is for seeking a corrected upward or downward absolute velocity value linearly corresponding to the portion of the upward and downward absolute velocities excluding a small dead band. A control target value calculating means is for multiplying the corrected upward or downward absolute velocity value obtained by the correction value calculating means by a control gain to obtain a control target value, and a control signal generating means is for previously storing information representative of a relative relation (which is obtained on the basis of a feature of the shock absorber of variable damping coefficient type) between the control target value and a control signal and for generating a corresponding control signal by inputting the control target value from a control target value calculating means, whereby the damping coefficient suitable for the upward or downward absolute velocity can be obtained to improve the comfort and steering ability of the vehicle.

In the above-mentioned suspension control apparatus, when a vehicle starts to climb up an undulating road, the vehicle body is displaced upwardly, so that the shock absorber is brought to a contracted condition, and the damping coefficient becomes extension-hard/contraction-soft. As a result, the change in road condition is hard to be transmitted to the vehicle body, thereby providing good comfort of the vehicle. When the vehicle reaches the top of a portion of the undulating road, the shock absorber starts to be extended under the action of a spring which has been compressed during the climbing up of the vehicle, and the vehicle body is moved upwardly at a relatively high speed due to the inertia of the vehicle and the extension of the shock absorber. In this case, since the coefficient of the shock absorber is extension-hard (maximum value)/contraction-soft, the shock absorber is hard to be extended so that the vehicle body is pulled downwardly by the unsprung mass to increase the downward acceleration of the vehicle. Consequently, the driver and passenger(s) feel uncomfortable because they feel like they are thrown upwardly.

On the other hand, when the vehicle starts to descend a portion of an undulating road, the vehicle body is displaced downwardly, so that the shock absorber is brought to an extended condition, and the damping coefficient becomes extension-soft/contraction-hard. When the vehicle reaches the bottom of the serpentine down-hill road, the shock absorber is brought to the contracted condition due to the inertia of the vehicle. In this case, since the damping coefficient is contraction-hard, the upward acceleration of the vehicle is abruptly increased. Consequently, the driver and passenger(s) also feel uncomfortable because they feel to be urged against seats strongly.

SUMMARY OF THE INVENTION

The present invention aims to eliminate the above-mentioned conventional drawback, and an object of the present invention is to provide a suspension control apparatus which can prevent upward acceleration and downward acceleration from being enhanced by a damping force of a shock absorber and in which a damping coefficient of the shock absorber is decreased when great acceleration is generated, whereby the driver and passenger(s) do not feel great acceleration.

To achieve the above object, according to one aspect of the present invention, there is provided a suspension control apparatus comprising a shock absorber of the variable damping coefficient type disposed between a sprung mass and an unsprung mass of a vehicle. An actuator adjusts a damping coefficient of the shock absorber of variable damping coefficient type. A damping coefficient controlling means is for sending a control signal to the actuator to adjust the damping coefficient in accordance with a running condition of a vehicle. An upward and downward acceleration detecting means is for detecting upward acceleration and downward acceleration of a body of the vehicle, and a control signal adjusting means is for adjusting the control signal to decrease the damping coefficient of the shock absorber when the upward or downward acceleration exceeds a predetermined upward or downward acceleration reference value.

To achieve the above object, according to another aspect of the present invention, there is provided a suspension control apparatus comprising a shock absorber of the variable damping coefficient type disposed between a sprung mass and an unsprung mass of a vehicle, an actuator for adjusting a damping coefficient of the shock absorber of the variable damping coefficient type, a damping coefficient controlling means for sending a control signal to the actuator to adjust the damping coefficient in accordance with a running condition of a vehicle, an upward and downward acceleration detecting means for detecting upward acceleration and downward acceleration of a body of the vehicle, an upward and downward acceleration change rate calculating means for calculating upward and downward acceleration change rates on the basis of the upward acceleration and downward acceleration, and a control signal adjusting means for adjusting the control signal to decrease the damping coefficient of the shock absorber when the upward or downward acceleration change rate exceeds a predetermined upward or downward acceleration change rate reference value.

To achieve the above object, according to a further aspect of the present invention, there is provided a suspension control apparatus comprising a shock absorber of the variable damping coefficient type disposed between a sprung mass and an unsprung mass of a vehicle, an actuator for adjusting a damping coefficient of the shock absorber of the variable damping coefficient type, a damping coefficient controlling means for sending a control signal to the actuator to adjust the damping coefficient in accordance with a running condition of a vehicle, and an upward and downward absolute velocity detecting means for detecting upward absolute velocity and downward absolute velocity of the sprung mass, and wherein the damping coefficient controlling means sends the control signal to the actuator so that the damping coefficient of extension side is increased as the absolute velocity is increased if the absolute velocity is directed upwardly and the damping coefficient of the contraction side is increased as the absolute velocity is decreased if the absolute velocity is directed downwardly.

BRIEF DESCRIPTION OF THE DRAWINGS

FIGS. 25A and 25B show in combination a flow chart showing a control target signal determining sub-routine in a controller of a suspension control apparatus according to a fifth embodiment of the present invention;

FIG. 27 is a timing chart showing various curves showing the operation of the suspension control apparatus according to the fifth embodiment;

FIGS. 28A and 28B show in combination a flow chart of the operation of a controller of a suspension control apparatus according to a sixth embodiment of the present invention;

DETAILED DESCRIPTION OF THE PREFERRED EMBODIMENTS

Figure 1:
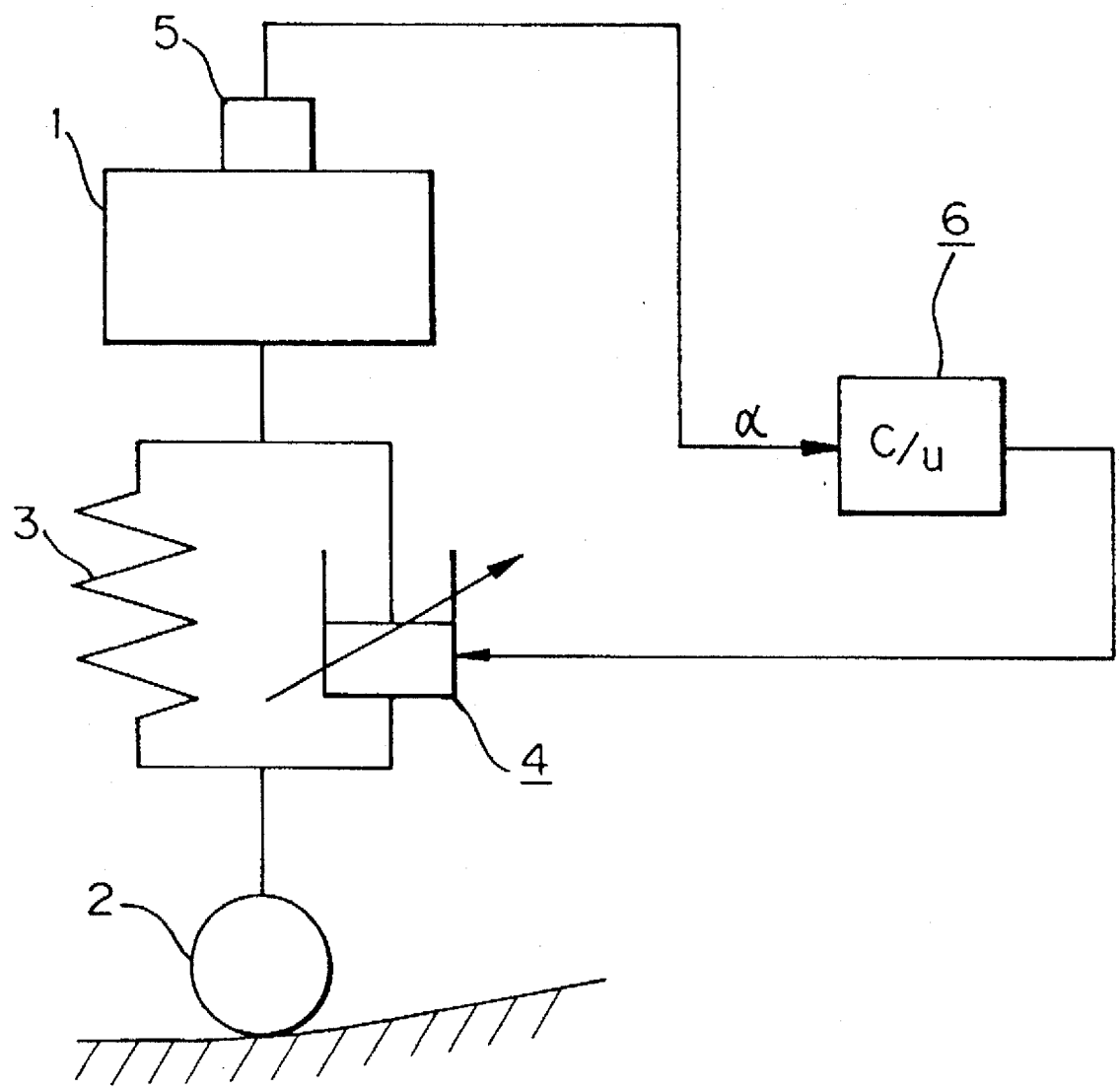
FIG. 1 is a schematic view of a suspension control apparatus according to a first embodiment of the present invention.

Now, a suspension control apparatus according to a first embodiment of the present invention will be explained with reference to FIGS. 1 to 8. In FIG. 1, a spring 3 and an expansible/contractible shock absorber 4 of variable and inversible damping coefficient type are arranged in parallel between a vehicle body (sprung mass) 1 and one of the four wheels (unsprung mass) 2 (only one of which is shown in FIG. 1) of a vehicle to support the vehicle body 1. An acceleration sensor (upward and downward acceleration detecting means) 5 for detecting acceleration $\alpha$ of the sprung mass of the vehicle body 1 (in an up-and-down direction) is attached to the vehicle body 1. An acceleration signal from the acceleration sensor 5 is supplied to a controller 6. Although four shock absorbers 4 of a variable damping coefficient type and four springs 3 are provided in correspondence to the four wheels 2, respectively, only one set of a shock absorber and a spring is shown for a simplicity's sake.

Figure 2:
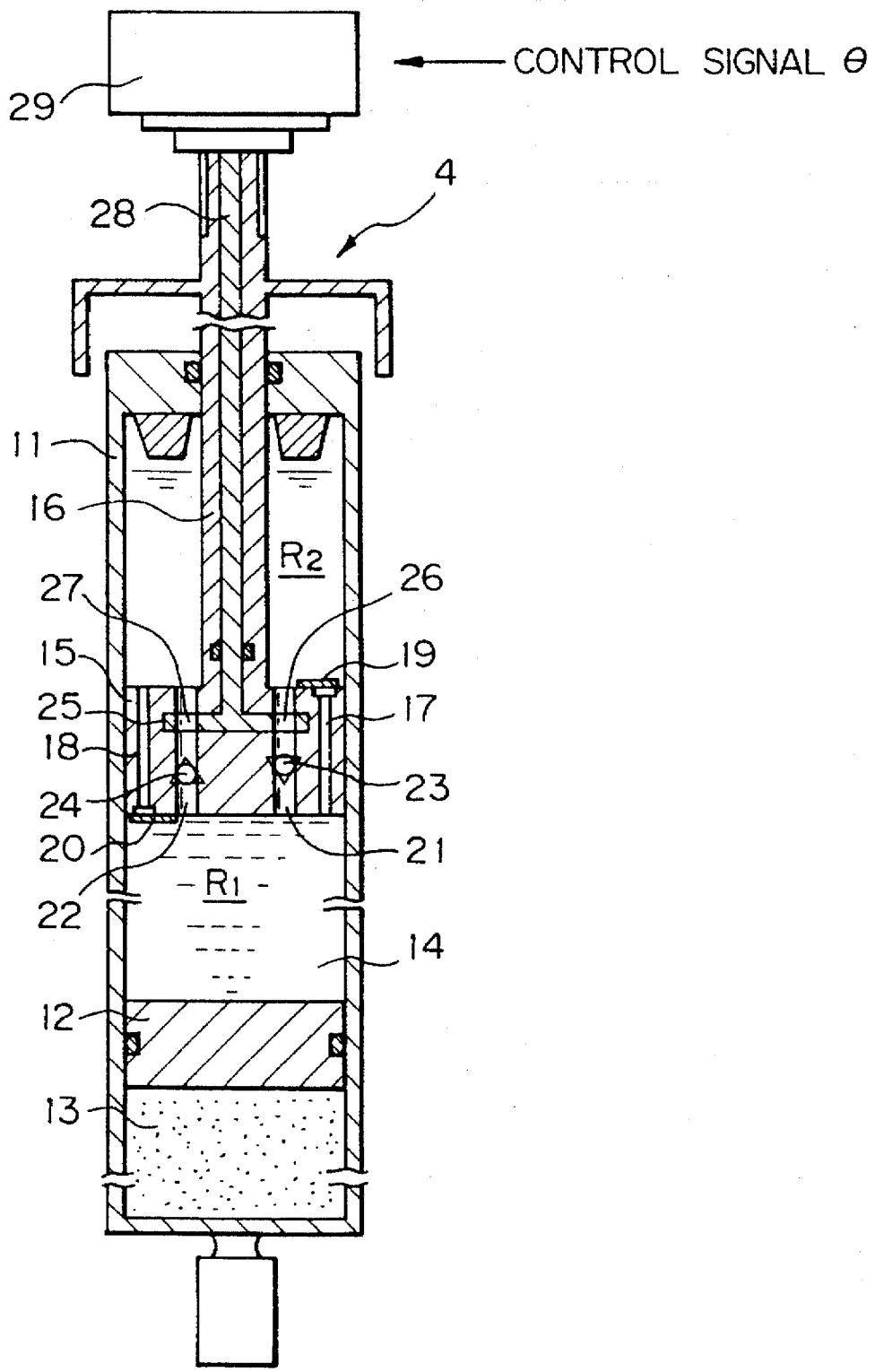
FIG. 2 is a sectional view of a shock absorber of a variable damping coefficient type used with the suspension control apparatus.

As shown in FIG. 2, the shock absorber 4 of variable damping coefficient type comprises a free piston 12 slidably mounted in a cylinder 11, which piston 12 divides the interior of the cylinder into a gas chamber 13 and an oil chamber 14. High pressure gas is contained in the gas chamber 13, and hydraulic oil is contained in the oil chamber 14. A piston 15 is slidably mounted in the oil chamber 14. The oil chamber 14 is divided into a lower chamber $R_1$ and an upper chamber $R_2$ by the piston 15. The piston 15 is connected to a piston rod 16 which extends outwardly of the cylinder 11 through the upper chamber $R_2$.

First and second communication passages 17, 18 are formed in the piston 15 to communicate the lower chamber $R_1$ with the upper chamber $R_2$. A first normally closed damping valve 19 is attached to an upper surface of the piston 15 to close the communication passage 17. When the piston rod 16 is retracted to increase a pressure in the lower chamber $R_1$ so that a difference between the pressure in the lower chamber and a pressure in the upper chamber $R_2$ exceeds a predetermined value, the first damping valve 19 is opened, with the result that the lower chamber $R_1$ is communicated with the upper chamber $R_2$ through the communication passage 17. A second normally closed damping valve 20 is attached to a lower surface of the piston 15 to close the communication passage 18. When the piston rod 16 is extended to increase the pressure in the upper chamber $R_2$ so that the difference between the pressure in the upper chamber and the pressure in the lower chamber $R_1$ exceeds a predetermined value, the second damping valve 20 is opened, with the result that the lower chamber $R_1$ is communicated with the upper chamber $R_2$ through the communication passage 18. Third and fourth communication passages 21, 22 diagonally opposed to each other with respect to the central axis of the piston rod 16 are also formed in the piston 15. The third and fourth communication passages 21, 22 are communicated with the upper chamber $R_2$ and the lower chamber $R_1$.

Figure 3:
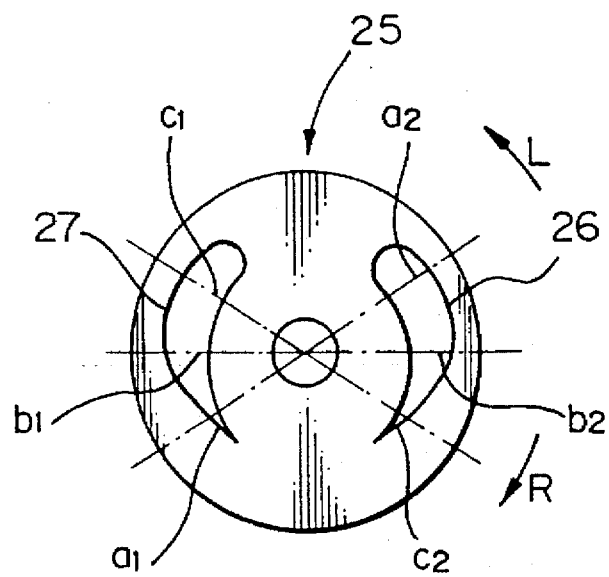
FIG. 3 is a plan view of a movable plate incorporated into the shock absorber of the variable damping coefficient type.

Check valves 23, 24 are arranged in the third and fourth communication passages 21, 22, respectively. The check valve 23 permits only an oil flow from the lower chamber $R_1$ to the upper chamber $R_2$, and the check valve 24 permits only an oil flow from the upper chamber $R_1$ to the lower chamber $R_1$. Within the piston 15, a disc-shaped movable plate 25 is mounted for rotational movement around the central axis of the piston rod 16. Upper and lower surfaces of the movable plate 25 extend across the third and fourth communication passages 21, 22. As shown in FIG. 3, a pair of arcuate elongated slots 26, 27 concentrically extending along a circumferential direction and diagonally opposed to each other are formed in the movable plate 25. An area of the elongated slot 26 is gradually decreased along a direction shown by the arrow R in FIG. 3; whereas, an area of the elongated slot 27 is gradually increased along the direction R.

Figure 4:
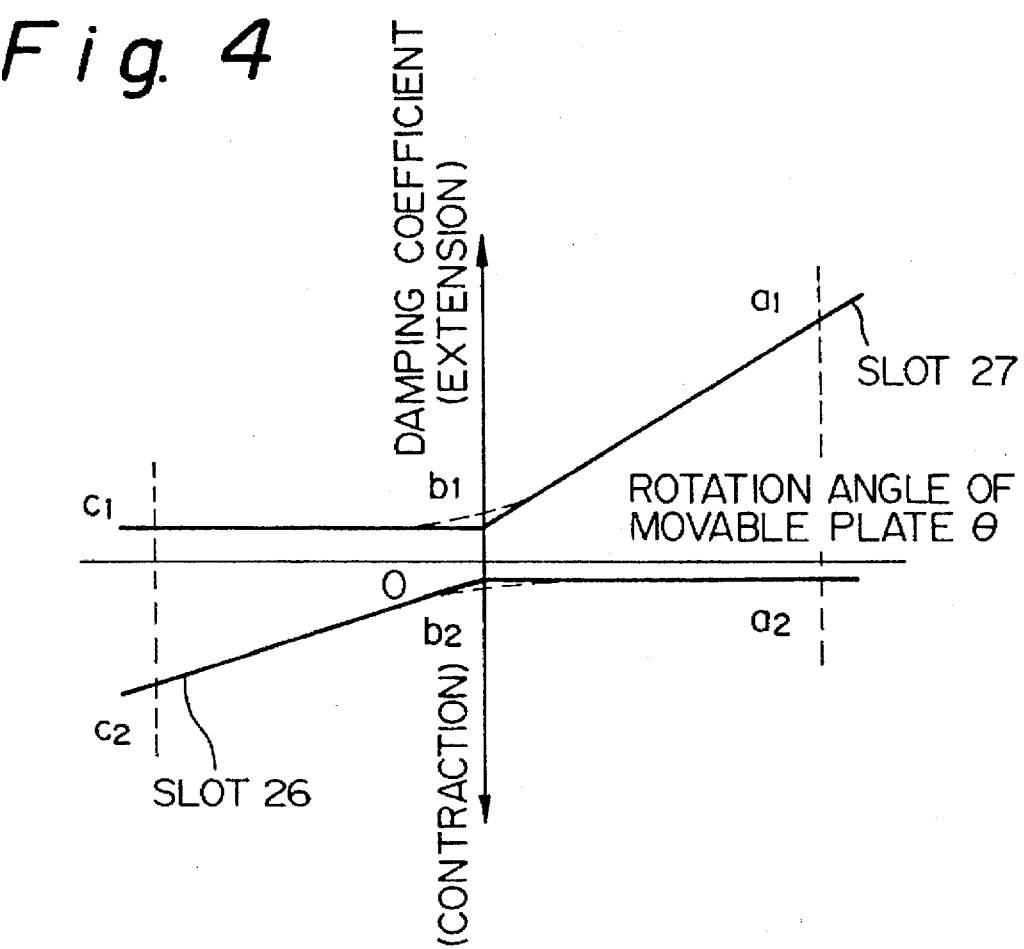
FIG. 4 is a graph showing a relation between a rotation angle of the movable plate and a damping coefficient.

When the movable plate 25 is rotated in the direction R or a direction shown by the arrow L, the areas of portions of the slots 26, 27 facing the third and fourth communication passages 21, 22 are gradually increased or decreased to gradually increase or decrease the opening areas of the third and fourth communication passages 21, 22, so that a damping feature of the shock absorber 4 of variable damping coefficient type as shown by the solid line in FIG. 4 can be obtained. Incidentally, as shown in FIG. 4, the damping coefficients may be smoothly changed, as shown by the broken lines, in the proximity of central positions $b_1$, $b_2$ of the elongated slots 26, 27 to smoothly change the damping coefficients.

In FIG. 2, the reference numeral 28 denotes an operation rod rotatably mounted in the piston rod 16 concentrically with the central axis of the piston rod and having a lower end connected to the movable plate 25; and the reference numeral 29 denotes an actuator such as a stepping motor attached to an upper end of the operation rod 28 and adapted to rotate the movable plate 25 in the direction R or the direction L. The actuator 29 serves to rotate the operation rod 28 in response to a control signal θ emitted from a control signal emitting portion 44 of the controller 6.

Next, a relation between portions ($a_2$–$b_2$–$c_2$, $a_1$–$b_1$–$c_1$) of the slots 26, 27 facing the third and fourth communication passages 21, 22 and the damping coefficient will be explained. Here, the portions of the slots 26, 27 facing the third and fourth communication passages 21, 22 are represented by a rotation angle θ of the movable plate 25. When the central positions $b_2$, $b_1$ of the slots 26, 27 face the third and fourth communication passages 21, the position of the movable plate 25 is referred to as "reference position" (θ=0) hereinafter.

(1) When the movable plate 25 is rotated from the reference position in the direction R, i.e., when the movable plate 25 is rotated in a positive direction (θ>0), the position $a_2$ of the slot 26 faces the third communication passage 21 and the position $a_1$ of the slot 27 faces the fourth communication passage 22. Consequently, the oil is apt to flow from the lower chamber $R_1$ to the upper chamber $R_2$ and is hard to flow from the upper chamber $R_2$ to the lower chamber $R_1$, thereby increasing the damping coefficient for the extension side and decreasing the damping coefficient for the contraction side.

(2) When the movable plate 25 is rotated from the reference position in the direction L, i.e., when the movable plate 25 is rotated in a negative direction (θ<0), the position $c_2$ of the slot 26 faces the third communication passage 21 and the position $c_1$ of the slot 27 faces the fourth communication passage 22. Consequently, the oil is hard to flow from the lower chamber $R_1$ to the upper chamber $R_2$ and is apt to flow from the upper chamber $R_2$ to the lower chamber $R_1$, thereby decreasing the damping coefficient for the extension side and increasing the damping coefficient for the contraction side.

The controller 6 is generally constituted by a damping coefficient controlling means comprising an integration treatment portion 41, an amplifier portion 42, a control signal emitting portion 43, and a control signal adjusting portion 44.

The integration treatment portion 41 and the acceleration sensor 5 constitute an upward and downward absolute velocity detecting means in which the upward acceleration α of the sprung mass from the acceleration sensor 5 is integrated to obtain an upward absolute velocity V which is in turn sent to the amplifier portion 42. The amplifier portion 42 determines a control target signal C by multiplying an input signal by gain K, which control target signal is in turn sent to the control signal emitting portion 43. The control signal emitting portion comprises a pre-correction signal calculating portion 45 and a control signal calculating portion 46.

Figure 5:
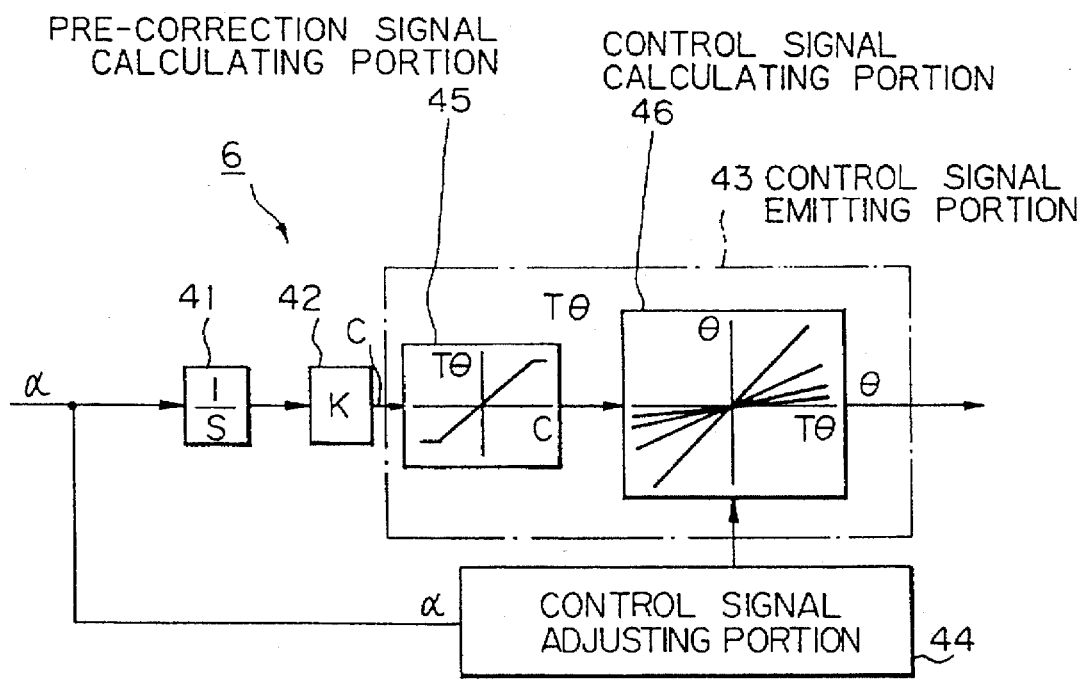
FIG. 5 is a block diagram of a controller of the suspension control apparatus.

The pre-correction signal calculating portion 45 stores therein information (a graph showing this information is illustrated in a block representing the pre-correction signal calculating portion 45 in FIG. 5) representative of the correspondence between the control target signal C and data Tθ (referred to as "pre-correction signal" hereinafter) proportional to the control target signal C, so that the corresponding pre-correction signal Tθ is obtained by inputting the control target signal C, and the obtained value is sent to the control signal calculating portion 46.

In the above explanation, while it is explained that the pre-correction signal Tθ is in proportion to the control target signal C, since the pre-correction signal Tθ is determined by the configuration of the elongated slots 26, 27 of the movable plate 25 and the like, the pre-correction signal is not limited to have the proportional relation to the control target signal, but is a certain function of the change in the control target signal C.

Figure 6:
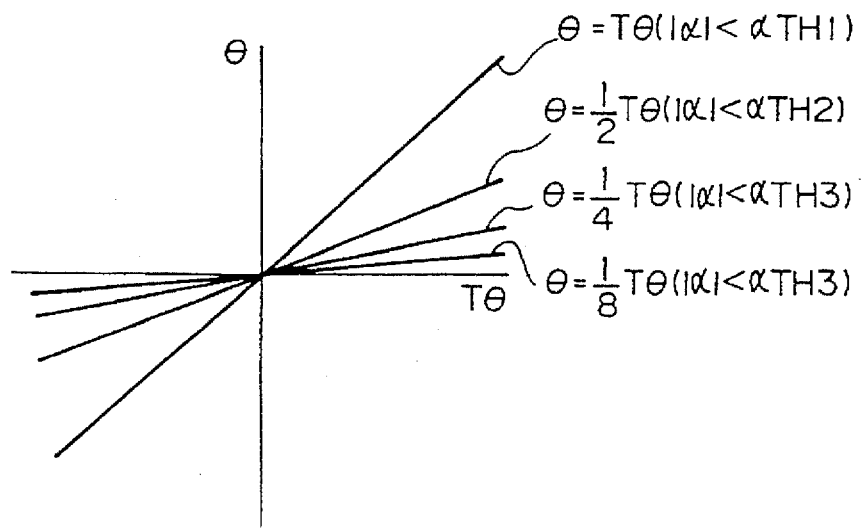
FIG. 6 is a graph showing data stored in a control signal calculating portion of the controller.

The control signal calculating portion 46 stores therein four proportion converting information data (as shown in FIG. 6) having relations to the pre-correction signal Tθ such as θ=Tθ, θ=(½)·Tθ, θ=(¼)·Tθ, θ=(⅛)·Tθ, respectively (where, θ is a control signal corresponding to the rotation angle θ of the movable plate 25). In this case, one proportion converting information data is selected by a command signal from the control signal adjusting portion 44, and a control signal θ corresponding to the inputted pre-correction signal Tθ is determined on the basis of the selected proportion converting information data, which control signal θ is in turn sent to the actuator 29.

The control signal adjusting portion 44 stores therein first, second and third sprung mass acceleration reference values $\alpha_{TH1}$, $\alpha_{TH2}$ (bigger than $\alpha_{TH1}$), $\alpha_{TH3}$ (bigger than $\alpha_{TH2}$). In this case, in an initial condition, the command signal designating $\theta=T\theta$ is outputted, and, when an absolute value $|\alpha|$ of the acceleration $\alpha$ of the sprung mass is greater than the first, second and third sprung mass acceleration reference values $\alpha_{TH1}$, $\alpha_{TH2}$ and $\alpha_{TH3}$, the command signals designating $\alpha=(\frac{1}{2})\cdot T\theta$, $\theta=(\frac{1}{4})\cdot T\theta$, $\theta=(\frac{1}{8})\cdot T\theta$ are outputted, respectively. By changing the command signal in this way, the control signal $\theta$ generated in the control signal calculating portion 46 is changed to decrease the damping coefficient for the extension side.

When the actuator 29 receives the control signal $\theta$, the movable plate 25 is rotated by the actuator, thereby establishing the damping coefficient for the extension side or the contraction side of the shock absorber 4 of the variable damping coefficient type corresponding to the rotation angle $\theta$ of the movable plate 25.

The number of the proportion converting information data stored in the control signal calculating portion 46 and the number of the sprung mass acceleration reference values are not limited to the above numbers, but may be greater or smaller than the above numbers.

Figure 7:
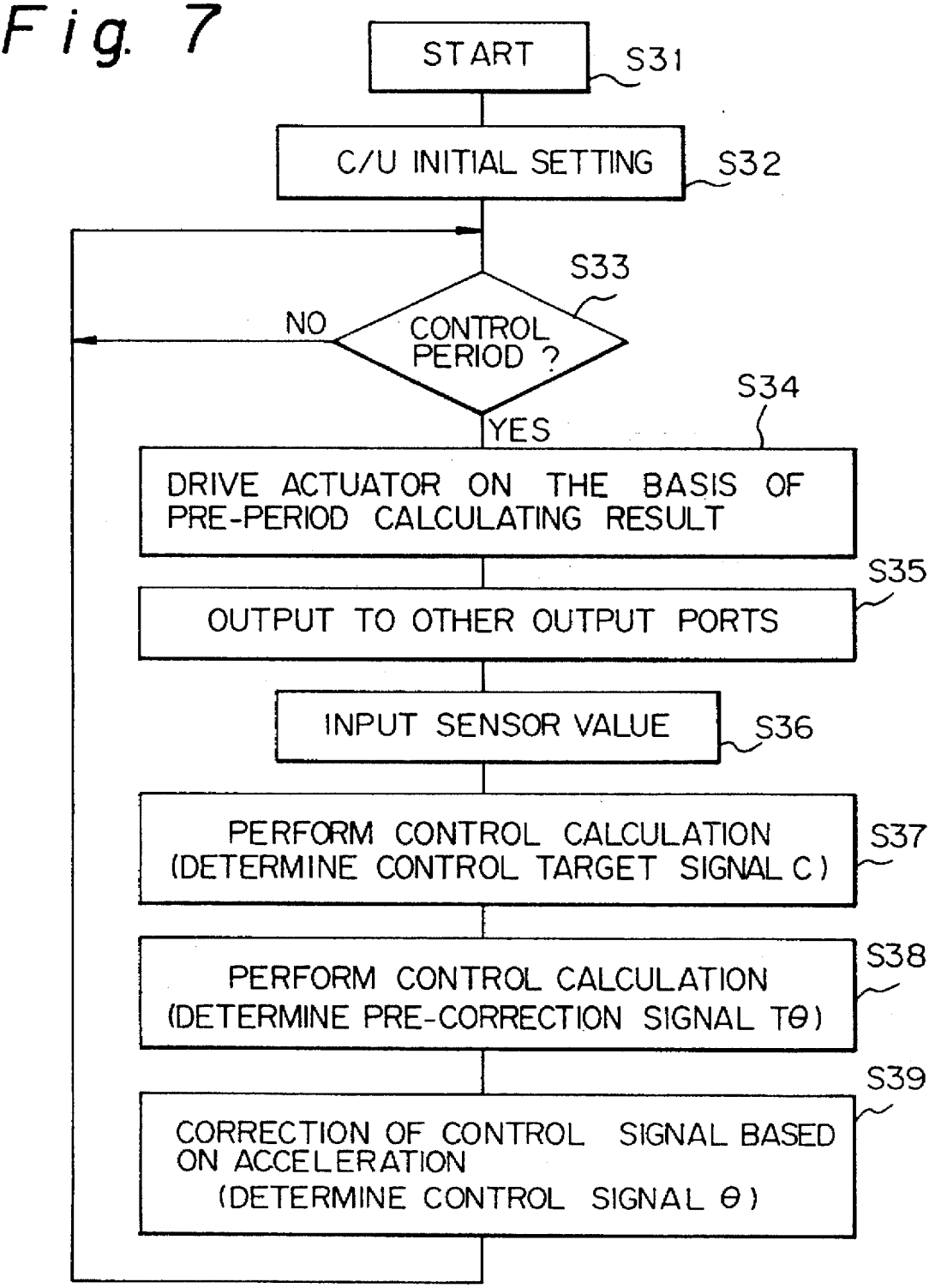
FIG. 7 is a flow chart showing control contents of the controller.

As shown in FIG. 7, when electric power generated upon engine start is supplied to the controller 6 having the above-mentioned construction (step S31), the initial setting is effected (step S32), and then it is judged whether a control period is established or not (step S33). In the step S33, the judgement for judging whether the control period is established is repeated until the control period is established.

In the step S33, if it is judged that the control period is established, the actuator 29 is driven (step S34). Then, in a step S35, signals are outputted to mechanisms other than the actuator 29, thereby controlling such mechanisms. Then, the sprung mass acceleration $\alpha$ from the acceleration sensor 5 is read (step S36). Thereafter, the absolute velocity V of the sprung mass is determined by the integration treatment portion 41, and the control target signal C is determined by the amplifier portion 42 on the basis of the absolute velocity V of the sprung mass (step S37). Then, the pre-correction signal calculating portion 45 receives the control target signal C, thereby determining the pre-correction signal $T\theta$ (step S38).

Following the step S38, a control signal correcting sub-routine is carried out to determine the control signal $\theta$ (step S40). On the basis of the control signal $\theta$ determined in the step S40, the actuator 29 is operated in the step S34 in the next control period, thereby obtaining the desired damping coefficient.

Figure 8:
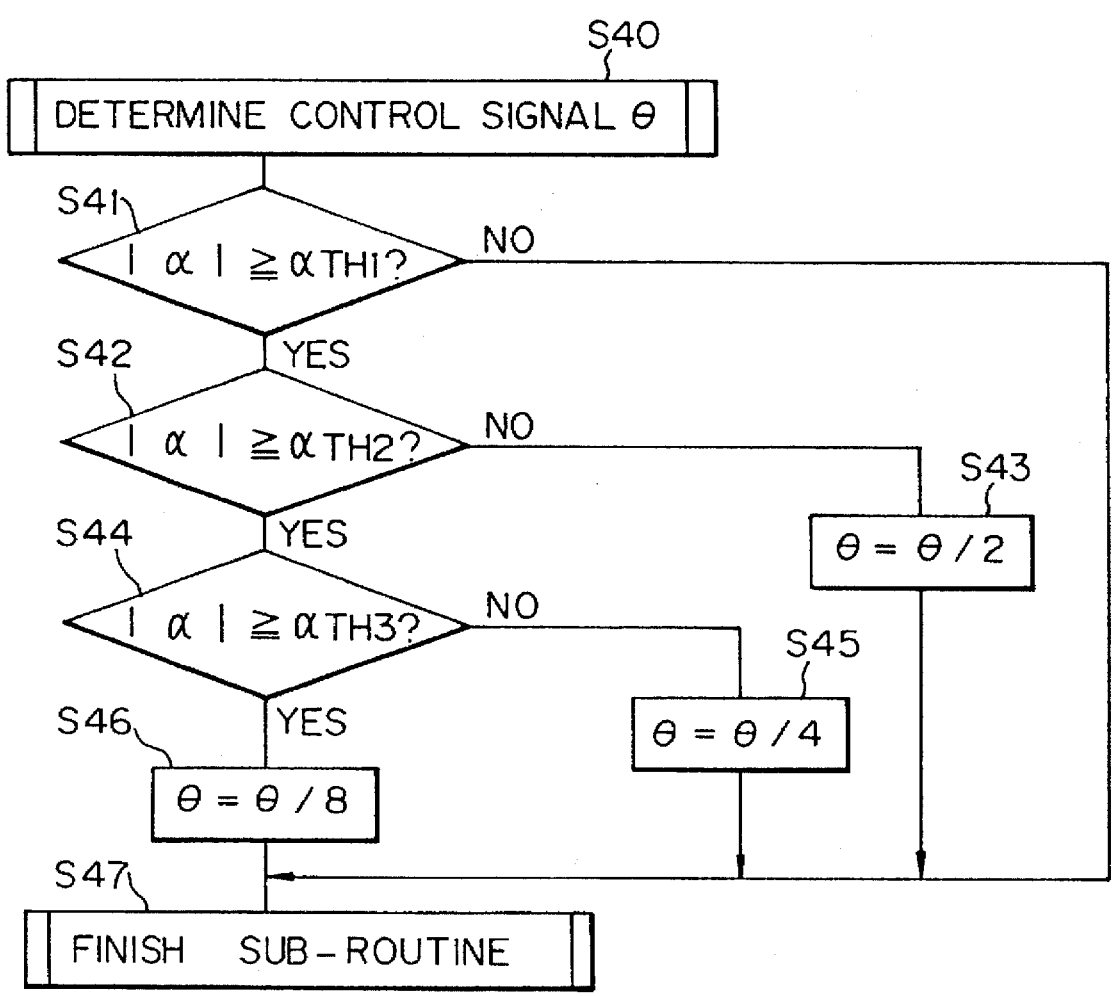
FIG. 8 is a flow chart showing a sub-routine for correcting a control signal in the flow chart of FIG. 7.

In the control signal correcting sub-routine (step S40), as shown in FIG. 8, first of all, in a step S41, it is judged whether the absolute value $|\alpha|$ of the sprung mass acceleration $\alpha$ is greater than the first sprung mass acceleration reference value $\alpha_{TH1}$. In the step S41, if NO (i.e. $|\alpha|<\alpha_{TH1}$), the command signal designating $\theta=T\theta$ (initial setting) is outputted, and the sub-routine is ended (step S47). In the step S41, if YES, the sub-routine goes to a next step S42, where it is judged whether the absolute value $|\alpha|$ of the sprung mass acceleration $\alpha$ is greater than the second sprung mass acceleration reference value $\alpha_{TH2}$. In the step S42, if NO (i.e. $|\alpha|<\alpha_{TH2}$), the command signal designating $\theta=(\frac{1}{2})\cdot T\theta$ is outputted (step S43), and the sub-routine is ended.

In the step S42, if YES, the sub-routine goes to a step S44, where it is judged whether the absolute value $|\alpha|$ of the sprung mass acceleration $\alpha$ is greater than the third sprung mass acceleration reference value $\alpha_{TH3}$. In the step S44, if NO (i.e. $|\alpha|<\alpha_{TH3}$), the command signal designating $\theta=(\frac{1}{4})\cdot T\theta$ is outputted (step S45), and the sub-routine is ended.

In the step S44, if YES, the command signal designating $\theta=(\frac{1}{8})\cdot T\theta$ is outputted (step S46), and the sub-routine is ended.

Figure 9:
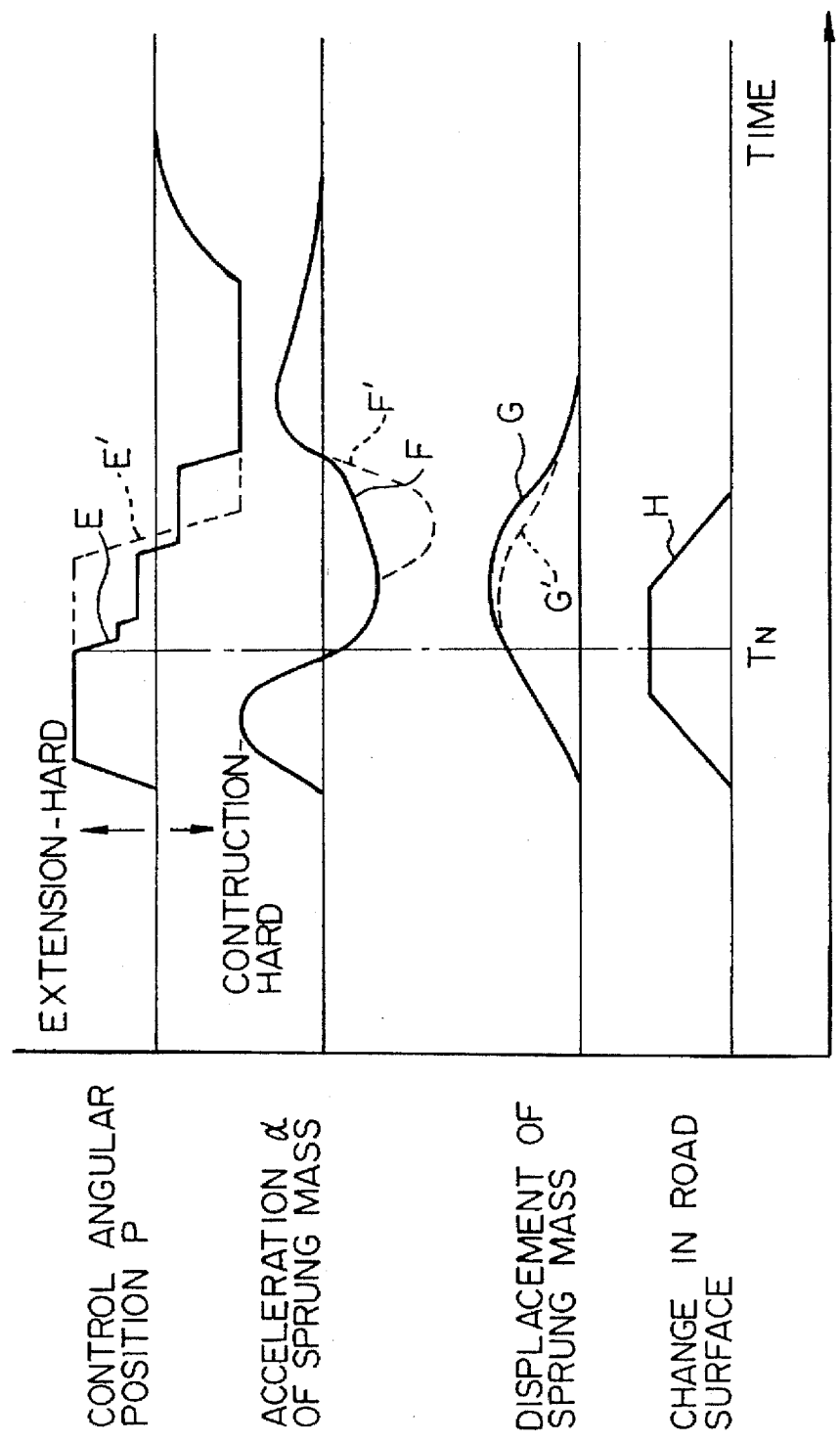
FIG. 9 is a timing chart showing various waves in the suspension control apparatus.

Next, an operation of the suspension control apparatus will be explained. As shown in FIG. 9, when the vehicle reaches the top (shown by $T_N$ in FIG. 9) of an undulation of a waving road and the downward acceleration $\alpha$ of the sprung mass is increased so that the absolute value $|\alpha|$ of the sprung mass acceleration $\alpha$ falls within a range between the first and second sprung mass acceleration reference values $\alpha_{TH1}$ and $\alpha_{TH2}$, the proportion converting information data regarding $\theta=(\frac{1}{2})\cdot T\theta$ is selected. As a result, the value of $\theta$ becomes smaller than in the case of the proportion converting information data $\theta=T\theta$ which is initially set (becomes $\frac{1}{2}$ of $T\theta$), thereby decreasing the actual control angular position P of the actuator 29 as shown by the solid line E. Incidentally, if the initially set value $\theta=T\theta$ is continuously used without correction, the control angular position P of the actuator 29 will be set as shown by the broken line E'.

Consequently, although the absolute velocity of the vehicle body is directed upwardly, and therefore the extension-hard condition is established, the level of the extension-hard condition of the shock absorber 4 is decreased, with the result that the shock absorber 4 can easily be extended under the action of the extension force of the spring 3. Thus, the relative displacement between the wheel 2 and the vehicle body 1 can easily be achieved in the extension direction, with the result that the sprung mass acceleration $\alpha$ is not enhanced by the damping force of the shock absorber 4, and thereby decreasing the downward acceleration $\alpha$ of the sprung mass of the vehicle body 1 as shown by the solid line F. Incidentally, if the initially set value $\theta=T\theta$ is continuously used without correction, the acceleration $\alpha$ of the sprung mass will be as shown by the broken line F'. As a result, the driver and passenger(s) do not feel bad because they do not feel as if they are thrown upwardly. In FIG. 9, the solid line G indicates displacement of the sprung mass according to the illustrated embodiment, and the broken line G' indicates displacement of the sprung mass if the initially set value $\theta=T\theta$ is continuously used without correction. Further, in FIG. 9, the solid line H indicates the change in height of the road surface.

On the other hand, when the vehicle starts to descend an undulation of a waving road, the vehicle body is displaced downwardly and the shock absorber 4 is brought to the extended condition. In this condition, the damping coefficient is extension-soft/contraction-hard. When the vehicle reaches the bottom of the undulation the shock absorber is brought to the contracted condition due to the inertia of the vehicle body. In this case, if the absolute value $|\alpha|$ of the acceleration $\alpha$ exceeds the reference value for the sprung mass acceleration, the level of the contraction-hard condition is decreased by the same control as that effected when the vehicle reaches the top of the undulation. Thus, the sprung mass acceleration is not enhanced by the damping force of the shock absorber 4, thereby preventing the upward acceleration from being increased abruptly. As a result, the driver and passenger(s) do not feel bad because they do not feel and if they are urged against the seats strongly.

Figure 10:
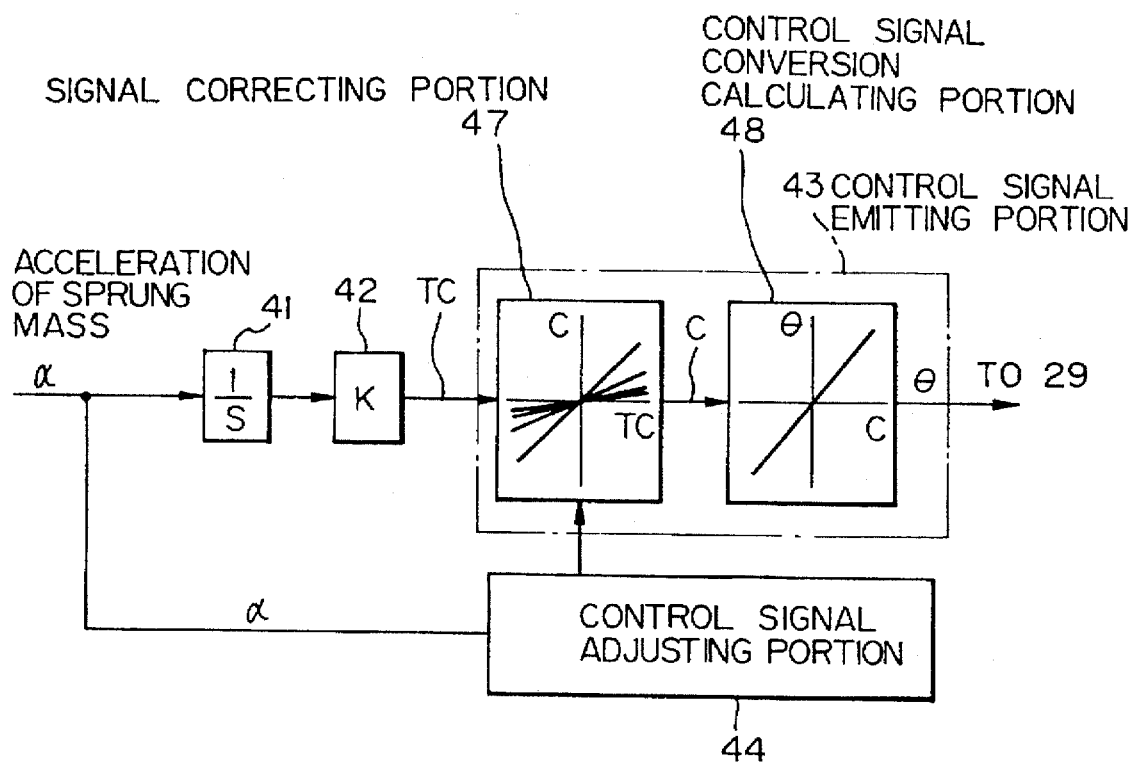
FIG. 10 is a block diagram of a controller of an alteration.
Figure 11:
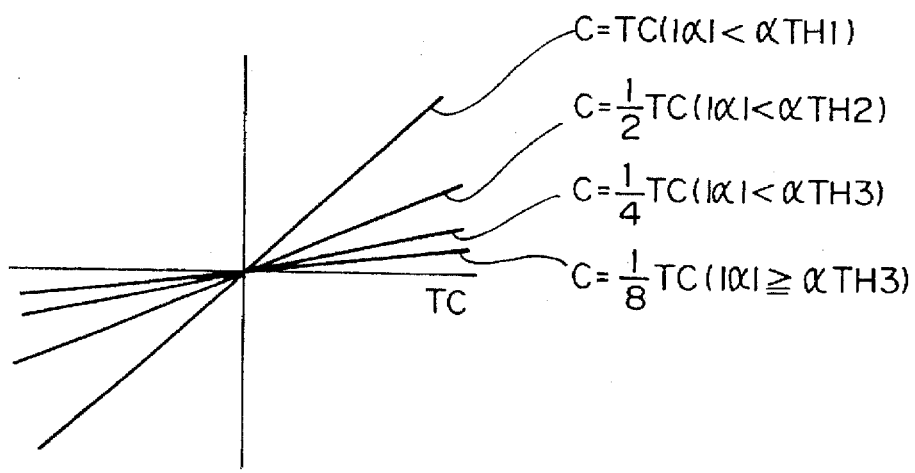
FIG. 11 is a graph showing data stored in a control signal calculating portion of the controller of FIG. 10.
Figure 12:
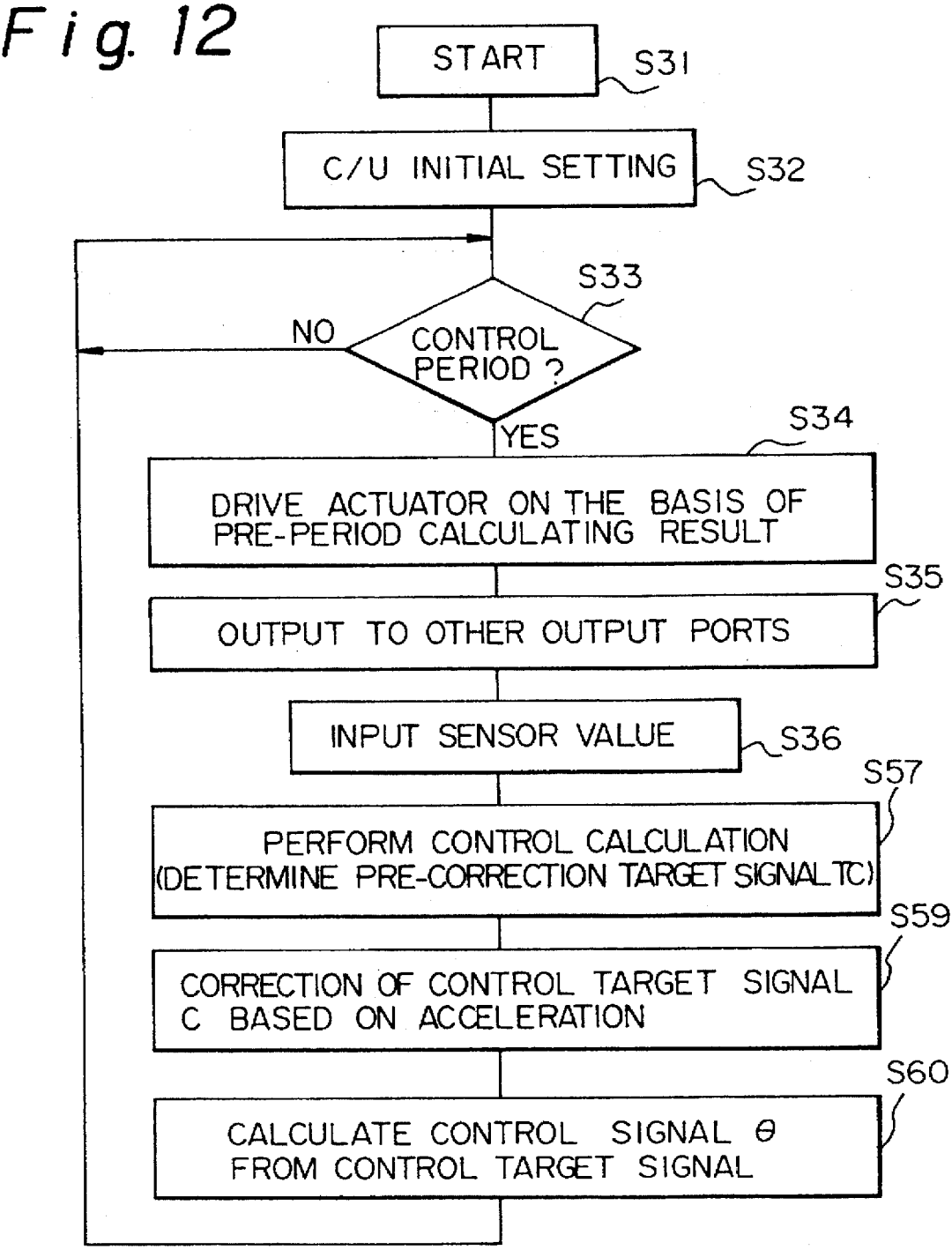
FIG. 12 is a flow chart showing control contents of the controller of FIG. 10.
Figure 13:
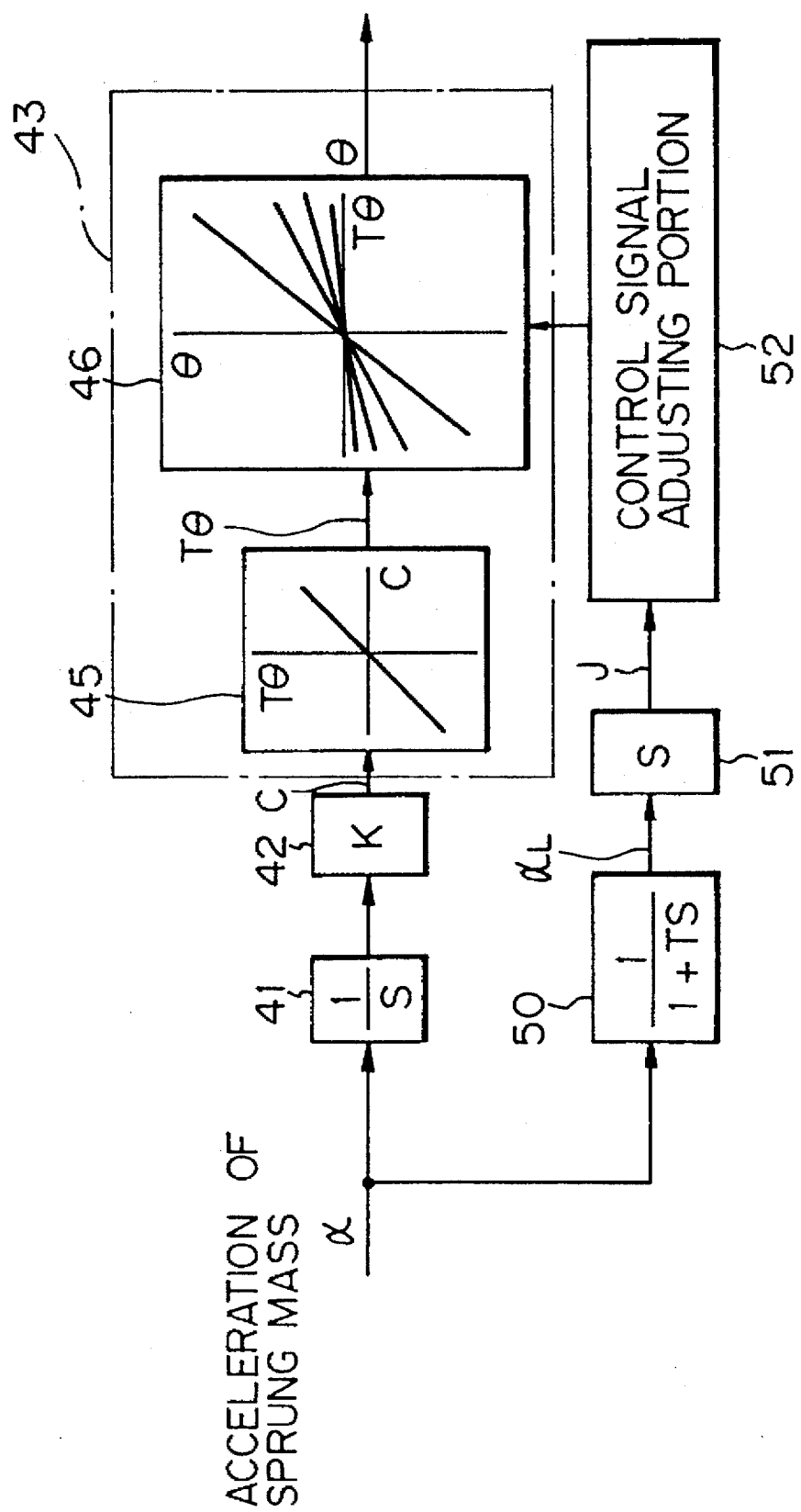
FIG. 13 is a block diagram of a controller of a suspension control apparatus according to a second embodiment of the present invention.

In the above-mentioned embodiment, while an example that the control signal emitting portion 43 includes the pre-correction signal calculating portion 45 as an earlier stage and the control signal calculating portion 46 as a subsequent stage, and the amplifier portion 42 sends the control target signal C to the pre-correction signal calculating portion 45 and the control signal adjusting portion 44 controls the control signal calculating portion 46 is explained, in place of this example, the arrangement as shown in FIGS. 10 to 12 may be adopted. That is to say, an apparatus shown in FIGS. 10 to 12 comprises an amplifier portion 42 for determining a pre-correction target signal TC by multiplying the input signal by gain K, a control signal emitting portion 43, and a control signal adjusting portion 44, and the control signal emitting portion 43 includes a signal correcting portion 47 as an earlier stage and a control signal conversion calculating portion 48 as a subsequent stage.

The signal correcting portion 47 stores therein four proportion converting information data (as shown in FIG. 11) having relations to the pre-correction target signal TC such as C=TC, C=($\frac{1}{2}$)·TC, C=($\frac{1}{4}$)·TC, C=($\frac{1}{8}$)·TC, respectively (where, C is a control target signal). In this case, one proportion converting information data is selected by a command signal from the control signal adjusting portion 44, and a control signal C corresponding to the inputted pre-correction target signal TC is determined on the basis of the selected proportion converting information data, which control signal C is outputted.

The control signal conversion calculating portion 48 stores therein information (a graph showing this information is illustrated in a block representing the control signal conversion calculating portion 48 in FIG. 10) representative of the correspondence between the control target signal C and data (referred to as "control signal" hereinafter) $\theta$ proportional to the control target signal C, so that the corresponding control signal $\theta$ is obtained by inputting the control target signal C, and the obtained control signal $\theta$ is sent to the actuator 29.

The control signal adjusting portion 44 stores therein first, second and third sprung mass acceleration reference values $\alpha_{TH1}$, $\alpha_{TH2}$ (bigger than $\alpha_{TH1}$), $\alpha_{TH3}$ (bigger than $\alpha_{TH2}$). In this case, in an initial condition, the command signal designating C=TC is outputted, and, when an absolute value |α| of the acceleration α of the sprung mass is greater than the first, second and third sprung mass acceleration reference values $\alpha_{TH1}$, $\alpha_{TH2}$ and $\alpha_{TH3}$, the command signals designating C=($\frac{1}{2}$)·TC, C=($\frac{1}{4}$)·TC, C=($\frac{1}{8}$)·TC are outputted, respectively. By changing the command signal in this way, the control target signal C having a smaller value is outputted to the signal correcting portion 47, and, thus, the control signal emitted from the control signal conversion calculating portion 48 tends to decrease the damping coefficient for the extension side.

As shown in FIG. 12, in place of the steps S37, S38 and S40 of FIG. 7, a step S57 for determining the pre-correction target signal TC, a step S59 for determining the control target signal C, and a step S60 for determining the control signal $\theta$ are used.

In the suspension control apparatus having such a construction, when the vehicle reaches the top of an undulation of a waving road and the downward acceleration α of the sprung mass is increased to exceed the reference value, as is in the first embodiment, the data (such as proportion converting information data C=($\frac{1}{2}$)·TC) smaller than the proportion converting information data C=TC which is initially set is selected to be used for conversion. As a result, the level of the extension-hard (maximum value) condition of the shock absorber 4 is decreased, so that the relative displacement between the wheel 2 and the vehicle body 1 can easily be achieved toward the extension direction. Consequently, the driver and passenger(s) do not feel bad because they do not feel as if they are thrown upwardly.

In the first embodiment, an example where the damping coefficient is decreased when the absolute value of the upward acceleration or the downward acceleration exceeds the reference value is explained. However, the present invention is not limited to such an example. Depending upon the kind of vehicle, the damping coefficient may be decreased only when the upward acceleration exceeds the reference value.

Next, a second embodiment will be explained with reference to FIGS. 13 to 16. In this second embodiment, in place of the control signal adjusting portion 44 of the first embodiment (FIG. 5), a low-pass filter 50 for removing a high frequency component from the sprung mass acceleration α so that the obtained value of the sprung mass acceleration α does not include the high frequency component, a jerk calculating portion 51 for differentiating a signal from the low-pass filter 50 to determine a change rate (referred to as "jerk" hereinafter) J of the sprung mass acceleration, and a control signal adjusting portion 52 are used.

The control signal adjusting portion 52 stores therein first, second and third jerk reference values $J_{TH1}$, $J_{TH2}$ (bigger than $J_{TH1}$), $J_{TH3}$ (bigger than $J_{TH2}$). In this case, in an initial condition, the command signal designating $\theta$=T$\theta$ is outputted, and, when an absolute value |J| of the jerk J is greater than the first, second and third jerk reference values $J_{TH1}$, $J_{TH2}$ and $J_{TH3}$, the command signals designating $\theta$=($\frac{1}{2}$)·T$\theta$, $\theta$=($\frac{1}{4}$)·T$\theta$, $\theta$=($\frac{1}{8}$)·T$\theta$ are outputted, respectively. By changing the command signal in this way, the control signal $\theta$ generated in the control signal calculating portion 46 is changed to decrease the damping coefficient for the extension side. Incidentally, the control signal calculating portion 46 includes the contents wherein the absolute value |α| is replaced by the absolute value |J| and the reference values $\alpha_{TH1}$, $\alpha_{TH2}$, $\alpha_{TH3}$ are replaced by the reference values $J_{TH1}$, $J_{TH2}$, $J_{TH3}$, respectively.

When the actuator 29 receives the control signal $\theta$, the movable plate 25 is rotated by the actuator, thereby establishing the damping coefficient for the extension side or the contraction side of the shock absorber 4 of the variable damping coefficient type corresponding to the rotation angle $\theta$ of the movable plate 25.

In the controller 6 having the above-mentioned construction, when electric power generated upon engine start is supplied to the controller 6 (step S31), the initial setting is effected (step S32), and then it is judged whether a control period is established or not (step S33). In the step S33, the judgement for judging whether the control period is established is repeated until the control period is established.

In the step S33, if it is judged that the control period is established, the actuator 29 is driven (step S34). Then, in a step S35, signals are outputted to mechanisms other than the actuator 29, thereby controlling such mechanisms. Then, the sprung mass acceleration α from the acceleration sensor 5 is read (step S36). Thereafter, the absolute velocity V of the sprung mass is determined by the integration treatment portion 41, and the control target signal C is determined by the amplifier portion 42 on the basis of the absolute velocity V of the sprung mass (step S37). Then, the pre-correction signal calculating portion 45 receives the control target signal C, thereby determining the corresponding pre-correction signal T$\theta$ (step S38).

Following the step S38, the jerk J is calculated (step S70). Then, a control signal correcting sub-routine based on the jerk J is carried out to determine the control signal $\theta$ (step S71). On the basis of the control signal $\theta$ determined in the step S71, the actuator 29 is operated in the step S34 in the next control period, thereby obtaining the desired damping coefficient.

Figure 15:
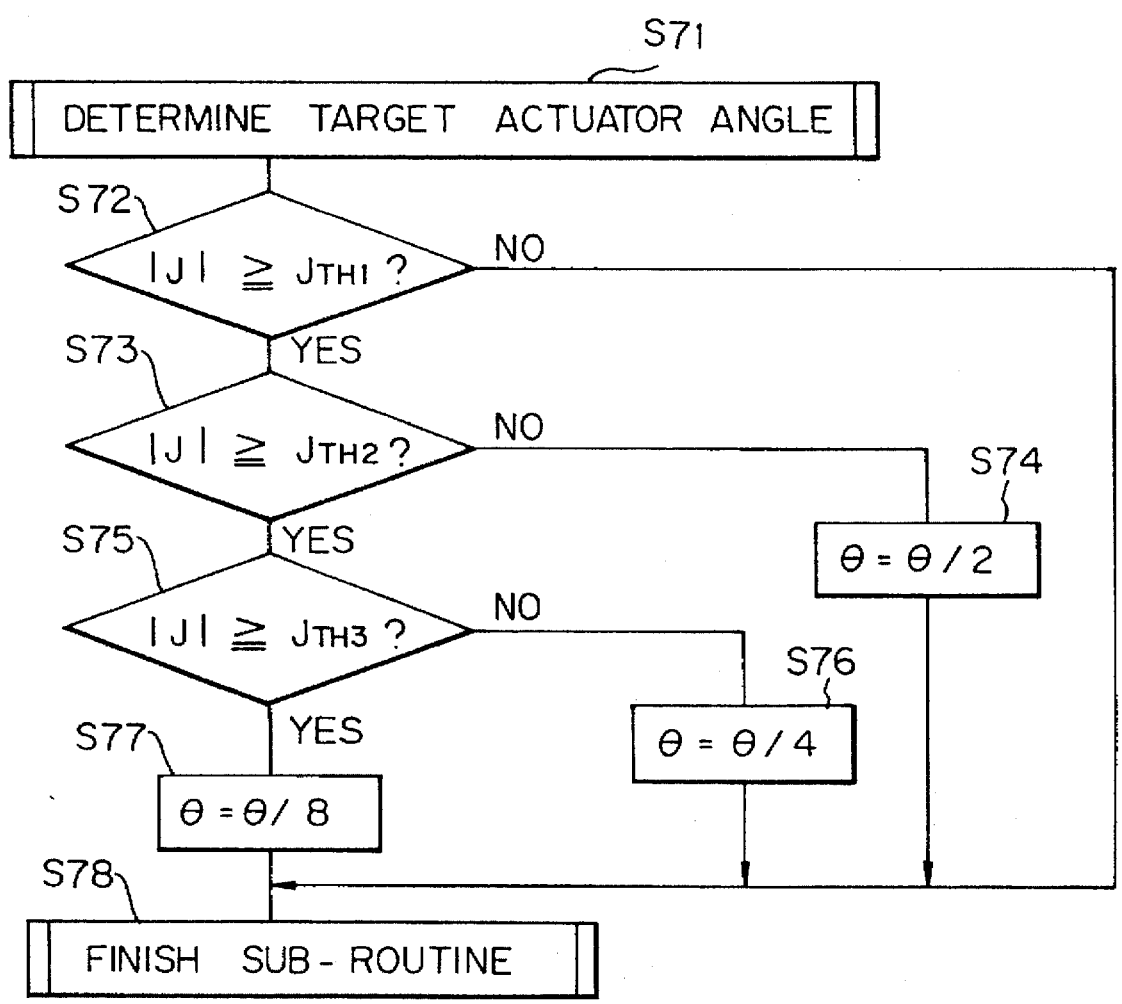
FIG. 15 is a flow chart showing a sub-routine for correcting a control signal in the flow chart of FIG. 14.

In the control signal correcting sub-routine (step S71), as shown in FIG. 15, first of all, it is judged whether the absolute value |J| of the jerk is greater than the first jerk reference value $J_{TH1}$ (Step S72). In the step S72, if NO (i.e. $|J|<J_{TH1}$), the command signal designating θ=Tθ (initial setting) is outputted, and the sub-routine is ended (step S78). In the step S72, if YES, the sub-routine goes to a next step S73, where it is judged whether the absolute value |J| of the jerk J is greater than the second jerk reference value $J_{TH2}$. In the step S73, if NO (i.e. $|J|<J_{TH2}$), the command signal designating θ=(½)·Tθ is outputted (step S74), and the sub-routine is ended.

In the step S73, if YES, the sub-routine goes to a step S75, where it is judged whether the absolute value |J| of the jerk J is greater than the third jerk reference value $J_{TH3}$. In the step S75, if NO (i.e. $|J|<J_{TH3}$), the command signal designating θ=(¼)·Tθ is outputted (step S76), and the sub-routine is ended.

In the step S75, if YES, the command signal designating θ=(⅛)·Tθ is outputted (step S77), and the sub-routine is ended.

Figure 16:
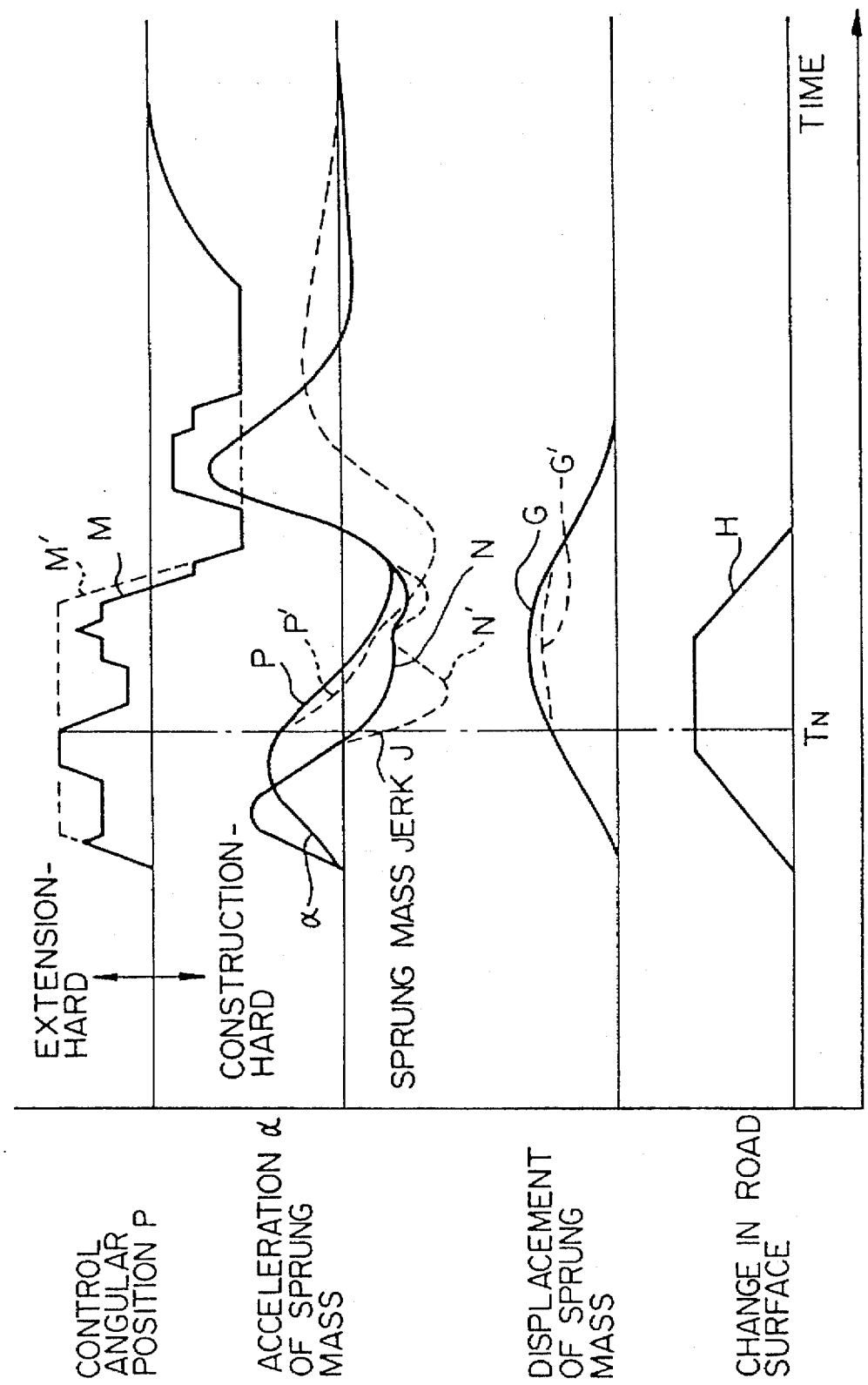
FIG. 16 is a timing chart showing various waves in the suspension control apparatus of FIG. 13.

Next, an operation of the suspension control apparatus according to the second embodiment will be explained. As shown in FIG. 16, when the vehicle reaches the top (shown by $T_N$ in FIG. 16) of an undulation of a waving road and the downward acceleration α of the sprung mass is increased so that the absolute value |J| of the jerk J falls within a range between the first and second jerk reference values $J_{TH1}$ and $J_{TH2}$, the proportion converting information data θ=(½)·Tθ is selected. As a result, the value of θ becomes smaller than in the case of the proportion converting information data θ=Tθ which is initially set (becomes ½ of Tθ), thereby decreasing the actual control angular position P of the actuator 29 as shown by the solid line M. Incidentally, if the initially set value θ=Tθ is continuously used without correction, the control angular position P of the actuator 29 will be set as shown by the broken line M'.

Consequently, the level of the extension-hard (maximum value) of the shock absorber 4 is decreased, with the result that the shock absorber 4 can easily be displaced in the extension direction under the action of the extension force of the spring 3. Thus, the relative displacement between the wheel 2 and the vehicle body 1 can easily be achieved in the extension side, with the result that the absolute value of the downward acceleration α of the sprung mass of the vehicle body 1 is decreased in the negative sign area as shown by the solid line P. If the initially set value θ=Tθ is continuously used without correction, the acceleration α of the sprung mass will be as shown by the broken line P'. As a result, the driver and passenger(s) do not feel bad because they do not feel as if they are thrown upwardly.

In FIG. 16, the solid line N and the broken line N' indicate jerks J corresponding to the solid line P and the broken line P' indicating the acceleration values α of the sprung mass. Further, the solid line G indicates upward displacement of the sprung mass according to the illustrated embodiment, and the broken line G' indicates upward displacement of the sprung mass without correction.

When the vehicle is descending the undulation of the waving road, the shock absorber 4 is brought to the contracted condition due to the inertia of the vehicle body. In this case, if the absolute value |J| of the jerk J exceeds the reference value, the level of the contraction-hard is decreased by the same control as that effected when the vehicle reaches the top of the undulation. Thus, the sprung mass acceleration is not enhanced by the damping force of the shock absorber 4, thereby preventing the upward acceleration from being increased abruptly. As a result, the driver and passenger(s) do not feel bad because they do not feel as if they are urged against the seats strongly.

Figure 17:
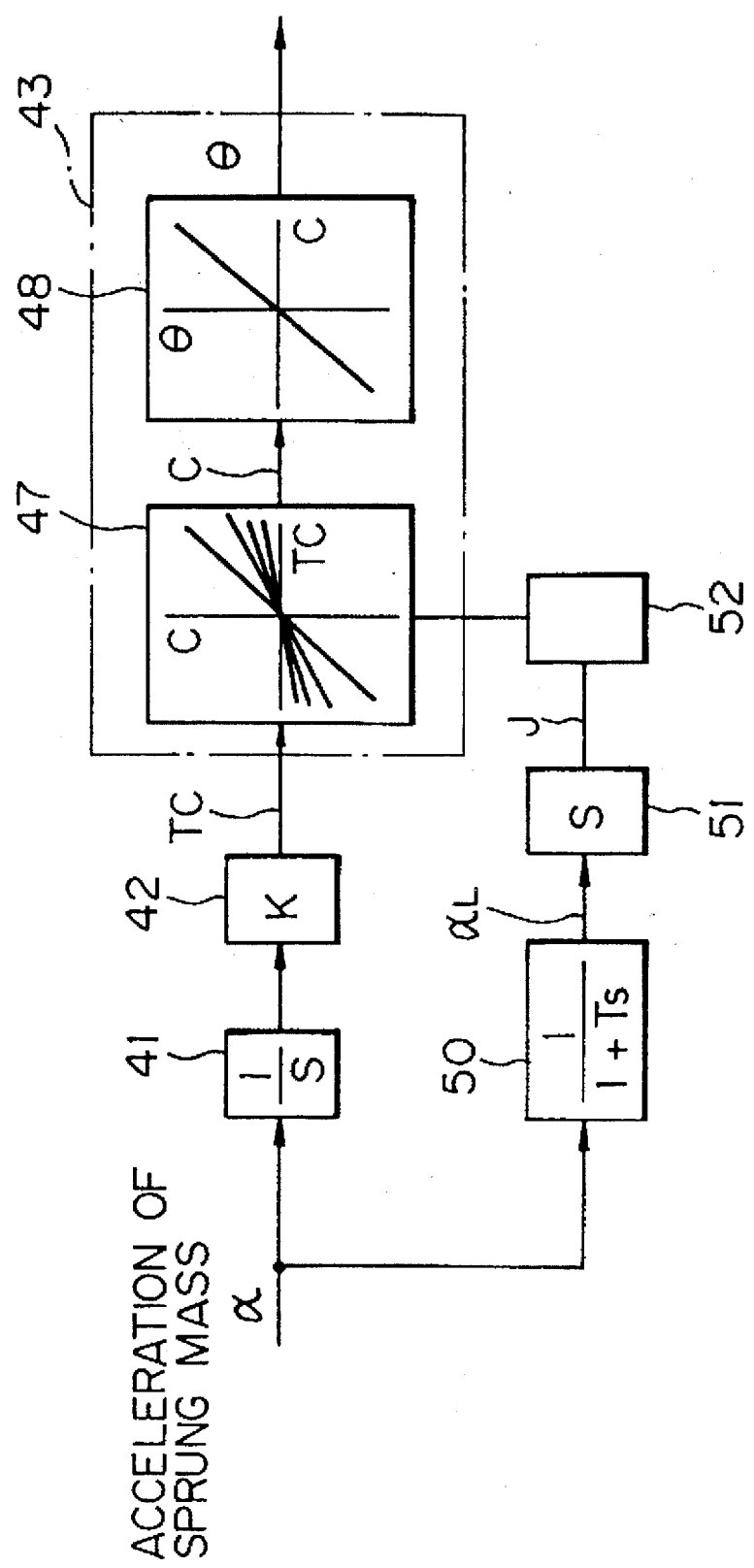
FIG. 17 is a block diagram of a controller having a control signal emitting portion in place of a control signal emitting portion of FIG. 13.
Figure 18:
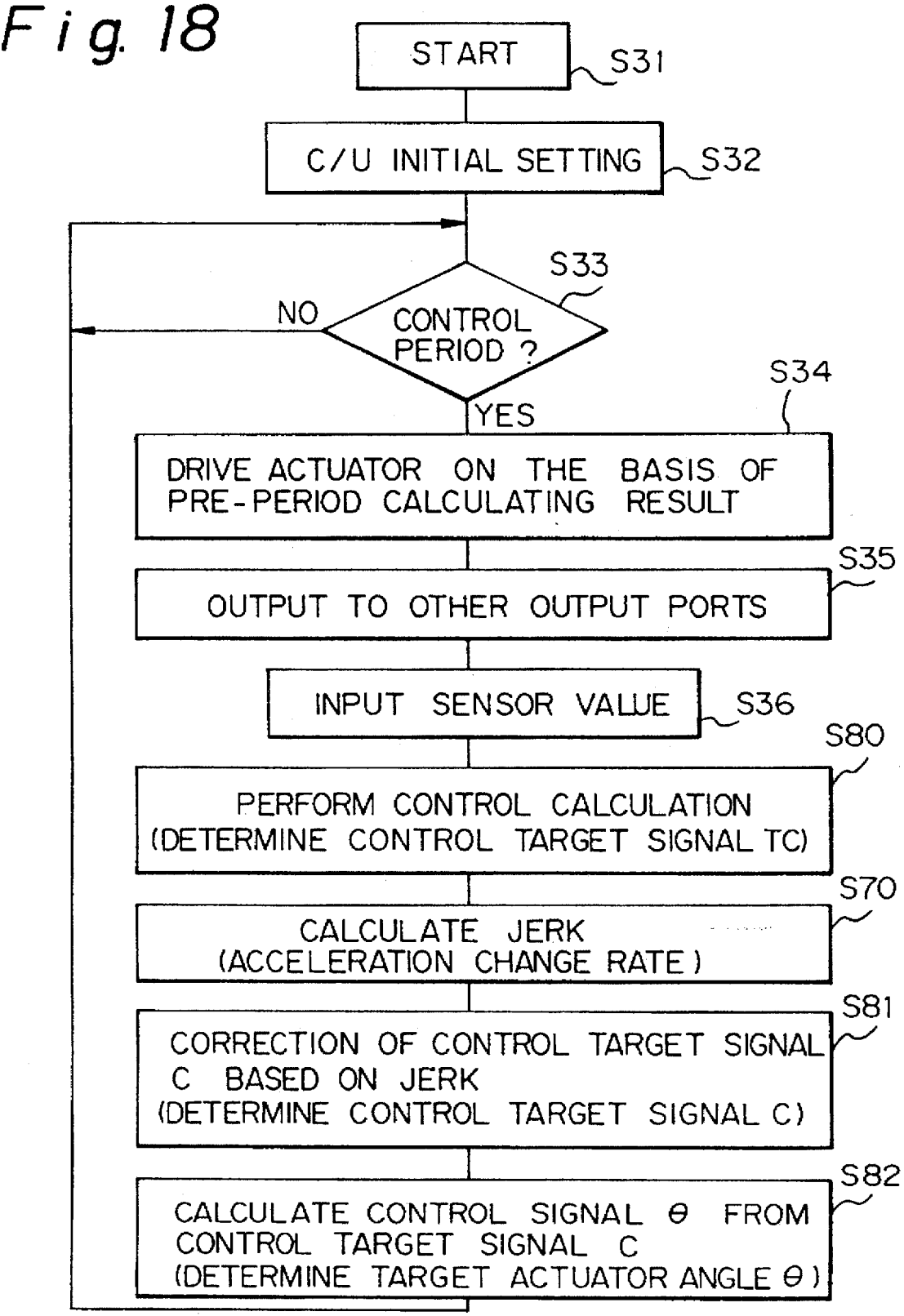
FIG. 18 is a flow chart showing control contents of the controller of FIG. 17.

In the above-mentioned second embodiment, while an example that the control signal emitting portion 43 includes the pre-correction signal calculating portion 45 as an earlier stage and the control signal calculating portion 46 as a subsequent stage, and the amplifier portion 42 sends the control target signal C to the pre-correction signal calculating portion 45 and the control signal adjusting portion 52 controls the control signal calculating portion 46 was explained, in place of this example, the arrangement as shown in FIGS. 17 and 18 may be adopted. That is to say, an apparatus shown in FIGS. 17 and 18 comprises an amplifier portion 42 for determining a pre-correction target signal TC by multiplying the input signal by gain K, a control signal emitting portion 43, and a control signal adjusting portion 52, and the control signal emitting portion 43 includes a signal correcting portion 47 as an earlier stage and a control signal conversion calculating portion 48 as a subsequent stage.

The signal correcting portion 47 stores therein four proportion converting information data. They are the same as that shown in FIG. 11. However, the absolute value |α| should be replaced by the absolute value |J| and the reference values $α_{TH1}$, $α_{TH2}$, $α_{TH3}$ should be replaced by the reference values $J_{TH1}$, $J_{TH2}$, $J_{TH3}$, respectively. They have relations to the pre-correction target signal TC such as C=TC, C=(½)·TC, C=(¼)·TC, C=(⅛)·TC, respectively (where C is a control target signal). In this case, one proportion converting information data is selected by a command signal from the control signal adjusting portion 52, and the control target signal C Corresponding to the inputted pre-correction target signal TC is determined on the basis of the selected proportion converting information data, which control target signal C is outputted.

The control signal conversion calculating portion 48 stores therein information (a graph showing this information is illustrated in a block representing the control signal conversion calculating portion 48 in FIG. 17) representative of the correspondence between the control target signal C and data (referred to as "control signal" hereinafter) θ proportional to the control target signal C, so that the corresponding control signal θ is obtained by inputting the control target signal C, and the obtained control signal θ is sent to the actuator 29.

The control signal adjusting portion 52 stores therein first, second and third jerk reference values $J_{TH1}$, $J_{TH2}$ (bigger than $J_{TH1}$), $J_{TH3}$ (bigger than $J_{TH2}$). In this case, in an initial condition, the command signal designating C=TC is outputted, and, when the absolute value of the jerk J is greater than the first, second and third jerk reference values $J_{TH1}$, $J_{TH2}$ and $J_{TH3}$, the command signals designating C=(½)·TC, C=(¼)·TC, C=(⅛)·TC are outputted, respectively. By changing the command signal in this way, the control target signal C having the smaller value is outputted to the signal correcting portion 47, and, thus, the control signal emitted from the control signal conversion calculating portion 48 is changed to decrease the damping coefficient for extension side.

Figure 14:
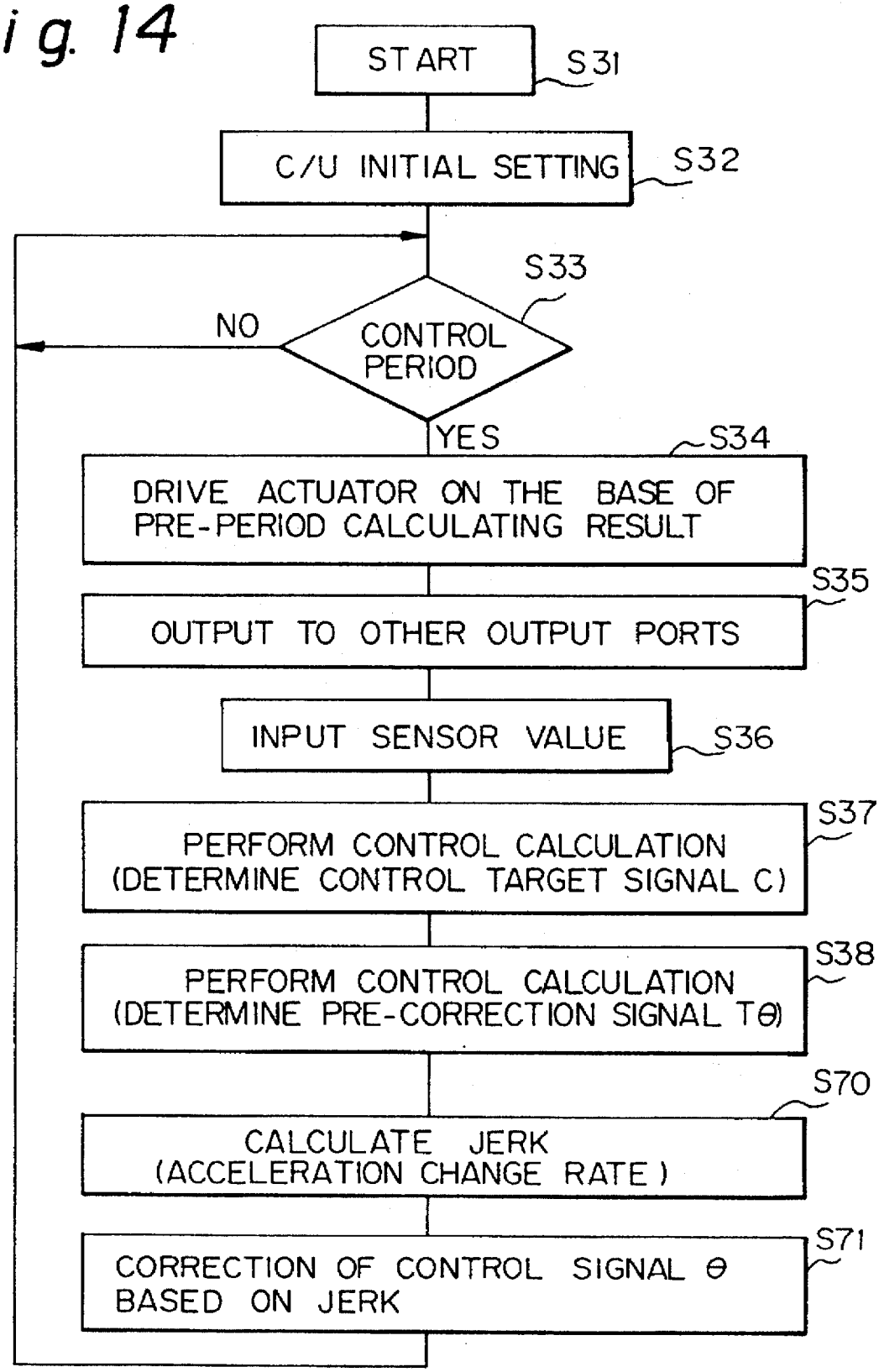
FIG. 14 is a flow chart showing control contents of the controller of FIG. 13.

As shown in FIG. 18, in place of the steps S37, S38 of FIG. 7 and the step S71 of FIG. 14, a step S80 for determining the pre-correction target signal TC, a step S81 for determining the control target signal C on the basis of the jerk J, and a step S82 for determining the control signal θ are used.

In the above explanation, while an example that the control signal θ is in proportion to the control target signal C is explained, since the control signal θ is determined by the configuration of the elongated slots 26, 27 of the movable plate 25 and the like, the control signal is not limited to have the proportional relation to the control target signal, but is a certain function of the change in the control target signal C.

In the suspension control apparatus having such a construction, when the vehicle reaches the top of an undulation of a waving road and the downward acceleration α of the sprung mass is increased to exceed the reference value, as is in the second embodiment, the data (such as proportion converting information data C=(½)·TC) smaller than in the case of proportion converting information data C=TC which is initially set is selected to be used for conversion. As a result, the level of the extension-hard (maximum value) condition of the shock absorber 4 is decreased, so that the relative displacement between the wheel 2 and the vehicle body 1 can easily be achieved in the extension direction. Consequently, the driver and passenger(s) do not feel bad because they do not feel as if they are thrown upwardly.

Figure 19:
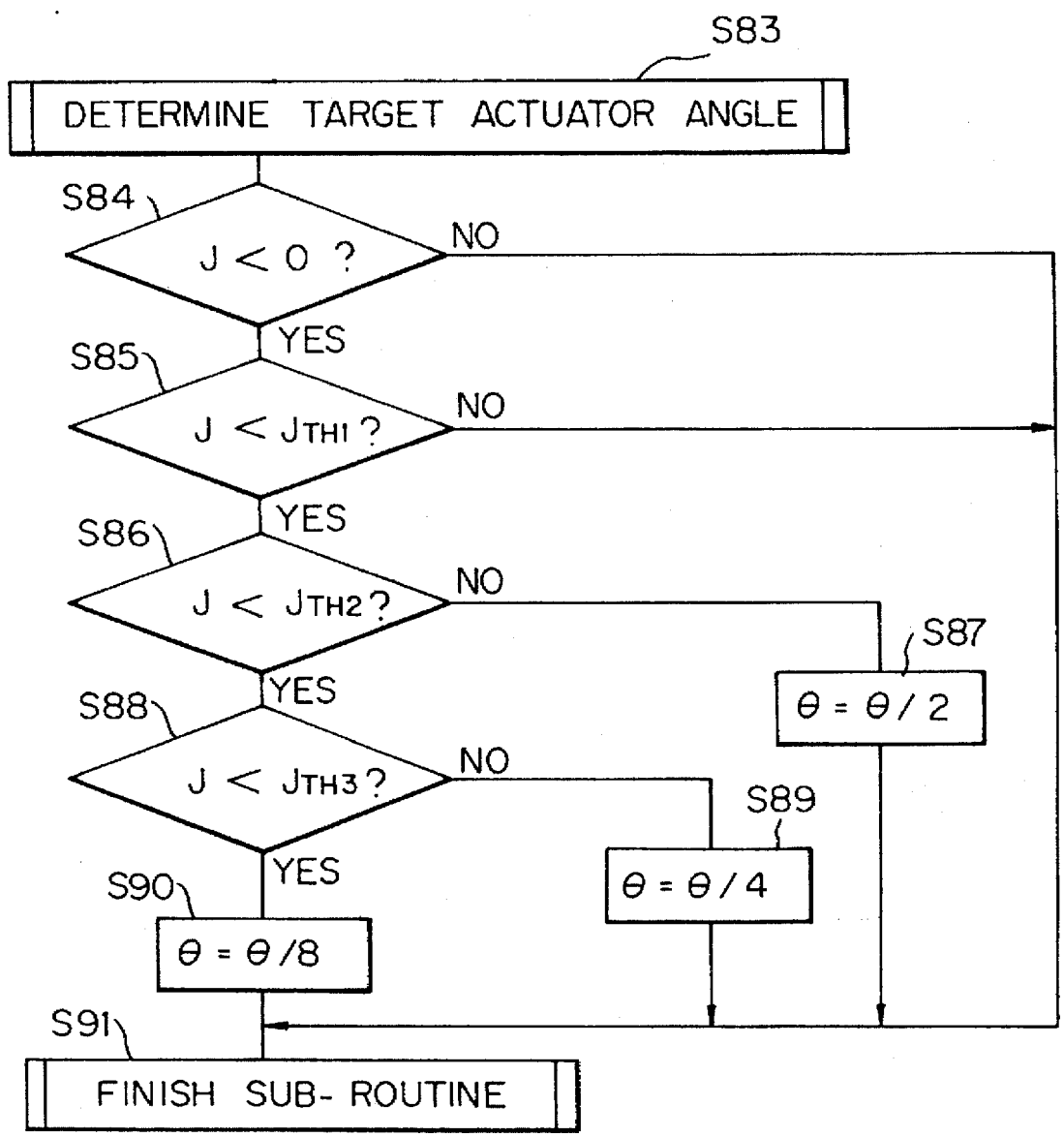
FIG. 19 is a flow chart showing control contents of a controller according to a third embodiment of the present invention.
Figure 20:
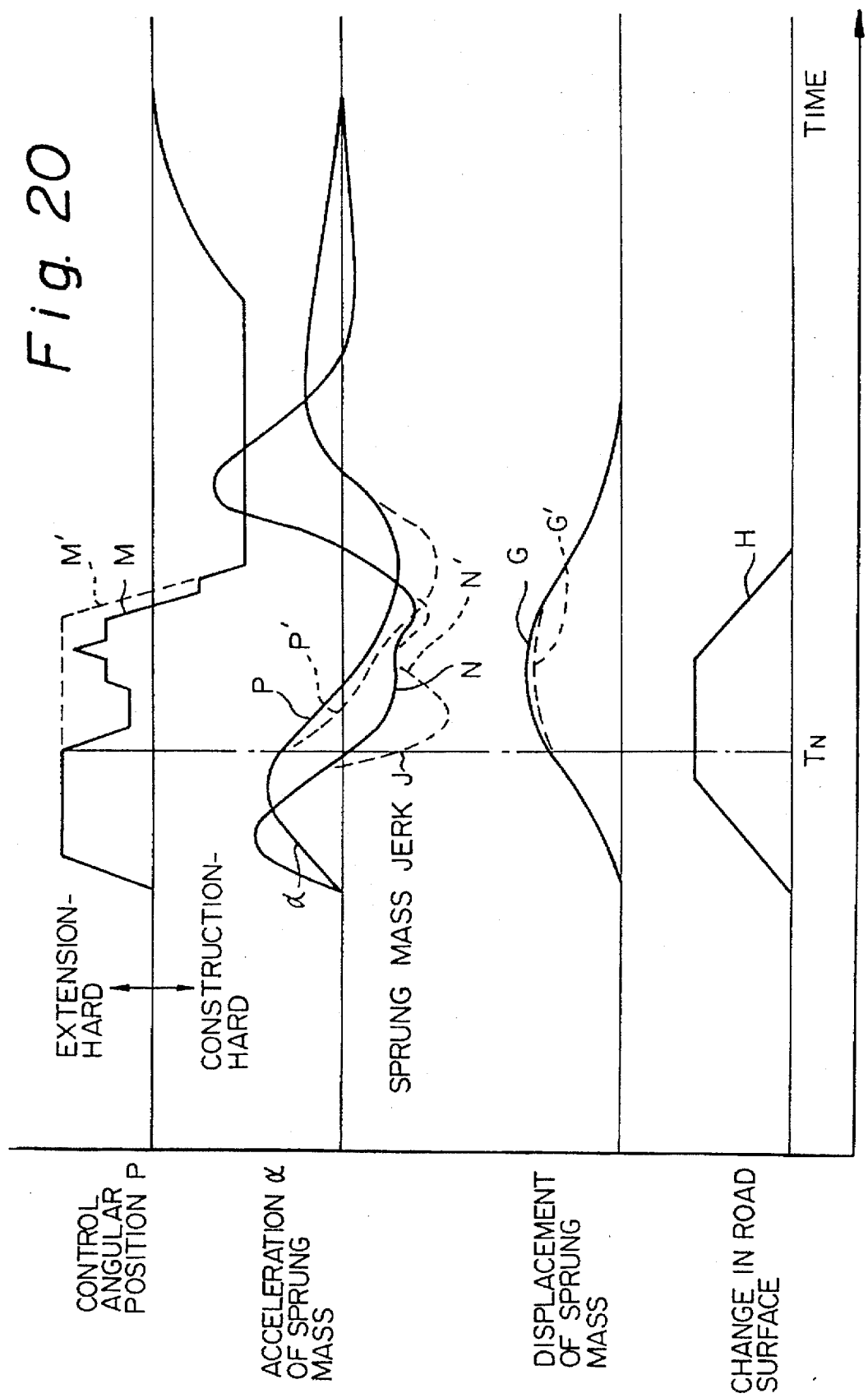
FIG. 20 is a timing chart showing various waves in a suspension control apparatus according to a third embodiment of the present invention.

Next, a third embodiment of the present invention will be explained with reference to FIGS. 19 and 20. The third embodiment differs from the above-mentioned second embodiment (FIGS. 13 to 16) in the point that, in place of the step S71 shown in FIGS. 14 and 15, a control signal correcting sub-routine (step S83) is used so that the correction is effected only when the sign of the jerk J is negative.

In this control signal correcting sub-routine (step S83), first of all, it is judged whether the jerk J is smaller than zero (excluding zero) (step S84). In the step S84, if NO (i.e. if the jerk J is not negative), the command signal designating θ=Tθ which is initially set is outputted, and the sub-routine is ended (step S91).

In the step S84, if YES (i.e. if the jerk J is negative), it is judged whether the jerk J is smaller than the first jerk reference value $J_{TH1}$ (step S85). In the step S85, if NO (i.e. if $J_{TH1} \leq J<0$), the command signal designating θ=Tθ which is initially set is outputted, and the sub-routine is ended (step S91).

In the step S85, if YES (i.e. if $J<J_{TH1}$), the subroutine goes to a next step S86, where it is judged whether the jerk J is smaller than the second jerk reference value $J_{TH2}$. In the step S86, if NO (i.e. if $J_{TH2} \leq J<J_{TH1}$), the command signal designating θ=(½)·Tθ is outputted (step S87), and the sub-routine is ended.

In the step S86, if YES, the sub-routine goes to a step S88, where it is judged whether the jerk J is smaller than the third jerk reference value $J_{TH3}$. In the step S88, if NO (i.e. if $J_{TH3} \leq J<J_{TH2}$), the command signal designating θ=(¼)·Tθ is outputted (step S89), and the sub-routine is ended.

In the step S88, if YES (i.e. if $J<J_{TH3}$), the command signal designating θ=(⅛)·Tθ is outputted (step S90), and the sub-routine is ended.

Next, an operation of the suspension control apparatus having the above-mentioned construction will be explained. As shown in FIG. 20, when the vehicle reaches the top (shown by $T_N$ in FIG. 20) of an undulation of a waving road and the jerk J becomes negative (for example, $J_{TH2}J<J_{TH1}$), the command signal designating θ=(½)·Tθ is outputted to decrease the actual control angular position P of the actuator 29 as shown by the solid line M. Incidentally, if the initially set value θ=Tθ is continuously used without correction, the control angular position P of the actuator 29 will be set as shown by the broken line M'.

Consequently, the level of the extension-hard (maximum value) condition of the shock absorber 4 is decreased, with the result that the shock absorber 4 can easily be extended under the action of the extension force of the spring 3. Thus, the relative displacement between the wheel 2 and the vehicle body 1 can easily be achieved in the extension direction, with the result that the absolute value of the downward acceleration α of the sprung mass of the vehicle body 1 is decreased as shown by the solid line P in the negative sign area. Incidentally, if the initially set value θ=Tθ is continuously used without correction, the acceleration α of the sprung mass will be as shown by the broken line P'. As a result, the driver and passenger(s) do not feel bad because they do not feel as if they are thrown upwardly. In FIG. 20, the solid line N and the broken line N' indicate the values of the jerk J corresponding to the solid line P and the broken line P' each representing the sprung mass acceleration α. Further, in FIG. 20, the solid line G indicates the displacement of the sprung mass in this embodiment, the broken line G' indicates the displacement of the sprung mass without correction in this embodiment, and the solid line H indicates the change in height of the road surface.

Next, a suspension control apparatus according to a fourth embodiment will be explained with reference to FIGS. 21 to 24, while sometimes referring to FIG. 4, FIG. 11 (the absolute value |α| should be replaced by the absolute value |J| and the reference values $α_{TH1}$, $α_{TH2}$, $α_{TH3}$ should be replaced by the reference values $J_{TH1R}$, $J_{TH2R}$, $J_{TH3R}$, respectively), and FIGS. 17 and 18. The suspension control apparatus serves to eliminate the fact that the driver and passenger(s) feel bad because they feel as if thrown upwardly (referred to as "jerk of extension side" hereinafter) due to the presence of the extension-hard condition when the vehicle reaches the top of an undulation of the waving road, and a controller of the suspension control apparatus has steps S32A, S81A (FIG. 21) in place of the steps S32, S81 in FIG. 18 and also has first, second and third counters (not shown) for monitoring the time by effecting count treatment regarding a control period $T_D$ (for example, 5–10 ms) as will be described later.

In the step S32A, the controller initially sets a limit value $CNT_{MAX}$ on the basis of count values $CNT_{J1R}$, $CNT_{J2R}$, $CNT_{J3R}$ of the first, second and third counters. As will be described later, in the first, second and third counters, if the jerk exceeds predetermined first, second or third threshold value $J_{TH1R}$, $J_{TH2R}$ or $J_{TH3R}$, the limit value $CNT_{MAX}$ is cleared and the increment treatment is effected regarding each control period $T_D$. It is so set that, when the time corresponding to ¼ of a reciprocal number (referred to as "sprung mass resonance period" hereinafter) of the sprung mass resonance frequency (about 0.8–1.4 Hz, depending upon the kind of vehicle) is elapsed, the count values $CNT_{J1R}$, $CNT_{J2R}$, $CNT_{J3R}$ become the limit value $CNT_{MAX}$ (saturation).

As mentioned above, the suspension control apparatus improves (suppresses) the extension-jerk, and it is so selected that the first, second and third threshold values $J_{TH1R}$, $J_{TH2R}$, $J_{TH3R}$ are negative and a relation $0>J_{TH1R}>J_{TH2R}>J_{TH3R}$ (i.e. $|J|<|J_{TH2R}|<|J_{TH3R}|$) is attained.

The first, second or third counter effects the increment treatment regarding each control period $T_d$ if the jerk thereof exceeds the first, second or third threshold value $J_{TH1R}$, $J_{TH2R}$ or $J_{TH3R}$, and the time elapsed after the threshold value $J_{TH1R}$, $J_{TH2R}$ or $J_{TH3R}$ is measured by the fact that the product of the increment value and the control period $T_d$ indicates "time".

The limit value $CNT_{MAX}$ can be obtained from the following equation:

$$CNT_{MAX}=(1/4)\cdot(1/\text{sprung mass resonance frequency})\cdot(1/T_d) \quad (1)$$

Figure 22A:
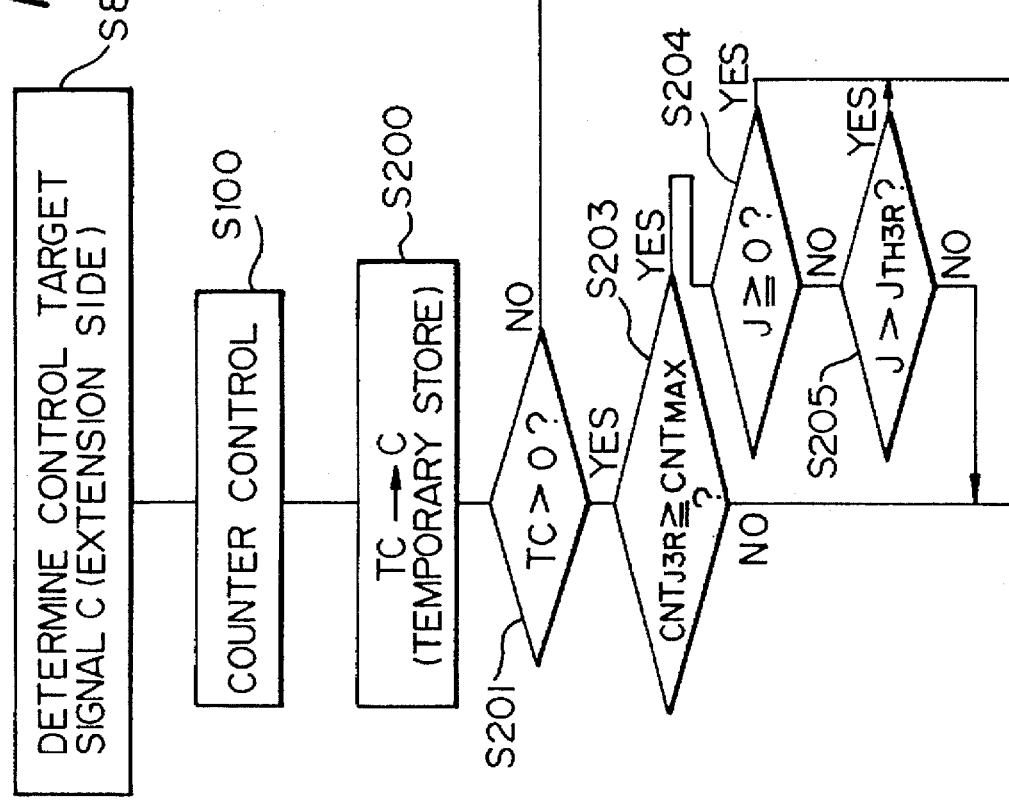
FIGS. 22A and 22B show in combination a flow chart showing a control target signal determining sub-routine in the flow chart of FIG. 21.
Figure 22B:
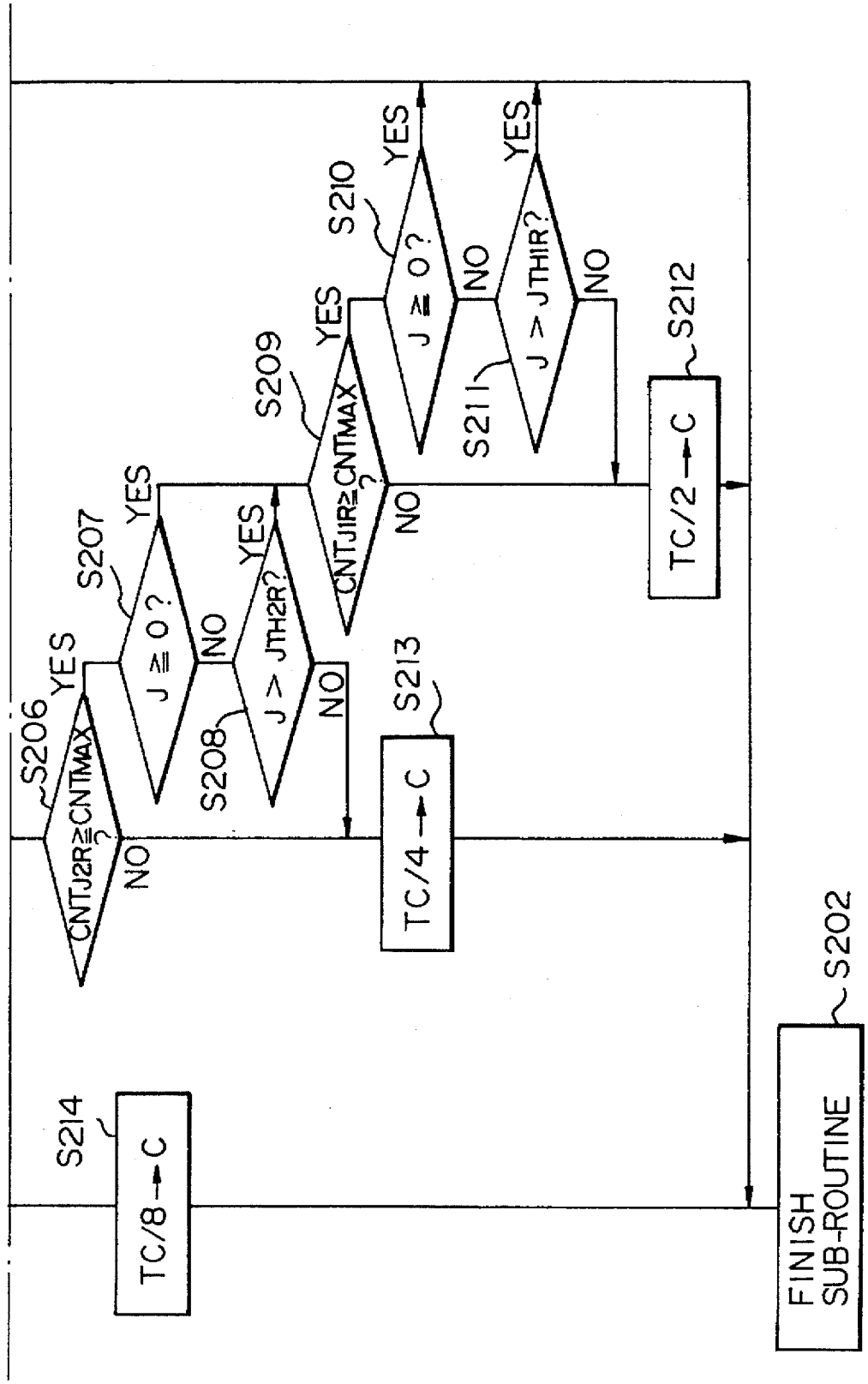
Figure 23A:
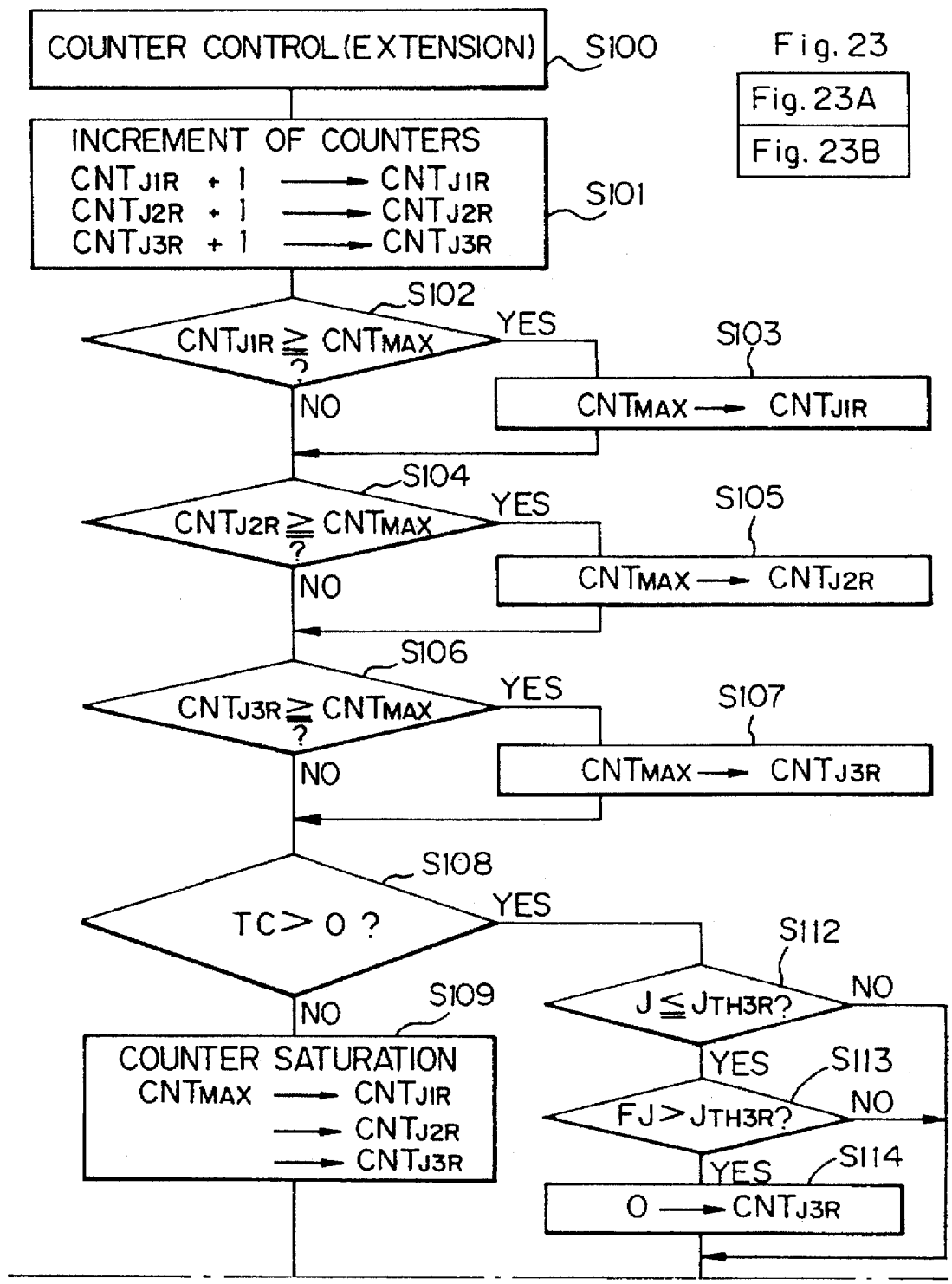
FIGS. 23A and 23B show in combination a flow chart showing a counter control treatment sub-routine in the flow chart of FIG. 22.
Figure 23B:
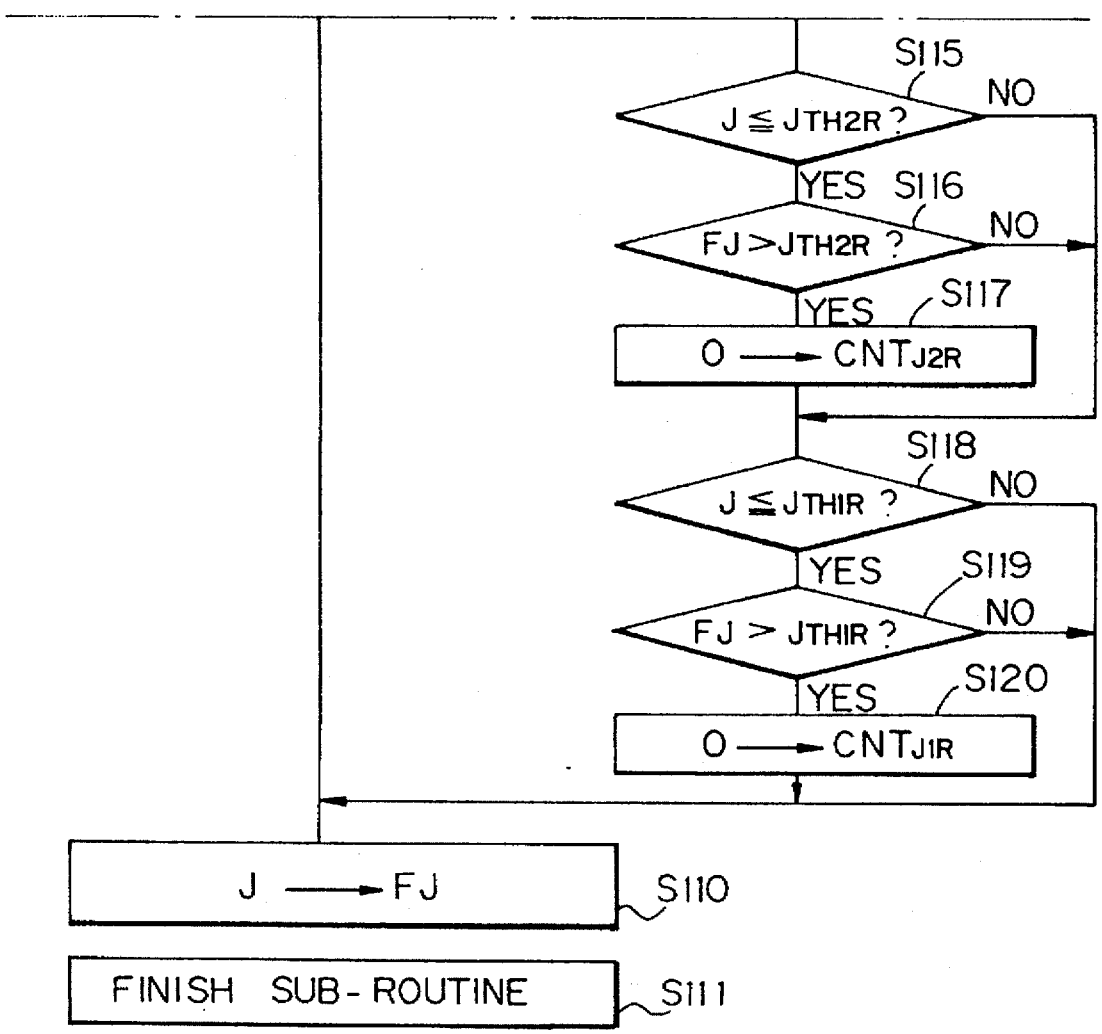

In the controller, first of all, in the step S81A, as shown in FIG. 22, counter control for defining a jerk correction time period (correction lasting period) is effected (step S100). In the step S100, as shown in FIG. 23, the increment regarding all of the counters is effected (step S101).

In a next step S102, it is judged whether the count value $CNT_{J1R}$ is greater than the limit value $CNT_{MAX}$. In this step S102, if it is judged that the count value $CNT_{J1R}$ is greater than the limit value $CNT_{MAX}$ (i.e. if YES), the count value $CNT_{J1R}$ is set to the limit value $CNT_{MAX}$ (step S103), thereby preventing overflow of the first counter. In the step S102, if it is judged that the count value $CNT_{J1R}$ is smaller than the limit value $CNT_{MAX}$ (i.e. if NO) or when the treatment in the step S103 is finished, the treatments in steps S104, S105 similar to the steps S102, S103 are effected regarding the second counter. If NO in the step S104 or when the treatment in the step S105 is finished, the treatments in steps S106, S107 similar to the steps S102, S103 are effected regarding the third counter. By effecting the treatments in the steps S105, S107, the overflows of the second and third counters can be prevented.

Then, in a step S108, it is judged whether the value of the pre-correction target signal TC is positive (TC>0) (i.e. damping coefficient of the extension side is great (extension-hard) (refer to the right side in FIG. 4)) or negative. The reason for effecting this judgement is that the correction of the sprung mass jerk (in which the fact that the driver and passenger(s) feel bad because they feel as if they are thrown upwardly due to the presence of the extension-hard condition when the vehicle reaches the top of the undulation of the waving road is eliminated by reducing the extension-hard condition, and the fact that the driver and passenger(s) feel bad because they feel as if they are urged against the seats strongly due to the presence of the contraction-hard condition when the vehicle reaches the bottom of the undulation of the waving road is eliminated by reducing the contraction-hard) is performed only regarding the extension side of the sprung mass.

In the step S108, if the pre-correction target signal TC is smaller than zero (i.e. if NO) (this means that the extension-soft condition is maintained (i.e. the damping coefficient is small) (refer to the left side in FIG. 4)), since the correction for reducing the extension-hard condition is not required, the count values $CNT_{J1R}$, $CNT_{J2R}$, $CNT_{J3R}$ of the first, second and third counters are set to the limit value $CNT_{MAX}$ (step S109). Then, the previous value FJ of the jerk is replaced by the present value J of the jerk, thereby preparing for treatment regarding a next control period (step S110), and then, the sub-routine is finished (step S111).

On the other hand, in the step S108, if the pre-correction target signal TC is positive (i.e. if YES), it is judged whether the present jerk J is smaller than the third threshold value $J_{TH3R}$ (step S112). In the step S112, if YES ($J \leq J_{TH3R}$), it is judged whether the previous jerk FJ is great in comparison with the third threshold value $J_{TH3R}$ (Step S113). In the step S113, if YES (FJ>$J_{TH3R}$), the count value $CNT_{J3R}$ of the third counter is set to zero (clear of the third counter) (step S114). The affirmative judgement in the steps S112, S113 means that the jerk J passed the third threshold value $J_{TH3R}$ between the previous control period and the present control period. Thus, by effecting the treatment in the next step S114, the third counter is brought to a waiting condition for the count treatment, and then, the count treatment is effected as will be described later.

Next to the step S114, treatments in steps S115, S116, S117 similar to the steps S112, S113, S114 are effected regarding the second counter and the second threshold value $J_{TH2R}$. Next to the step S117, treatments in steps S118, S119, S120 similar to the steps S112, S113, S114 are effected regarding the first counter and the first threshold value $J_{TH1R}$.

In the steps S112, S113, if NO, the program goes to the step S115. In the steps S115, S116, if NO, the program goes to the step S118. In the steps S118, S119, if NO, the program goes to the step S110.

After the count control in the step S100 is finished, as shown in FIG. 22, the program goes to a step S200, where the pre-correction target signal TC is temporarily stored in the control target signal C. In the suspension control apparatus, as will be described later, by using C=TC/2, C=TC/4, C=TC/8 (refer to FIGS. 17 and 11), the jerk of the extension side is improved. However, if the improvement in jerk of the extension side is not required, the damping coefficient will be set by using C=TC.

Then, in a step S201, it is judged whether the value of the pre-correction target signal TC is positive (TC>0) (i.e. damping coefficient of extension side is great (extension-hard) (refer to the right side in FIG. 4)) or negative. In the step S201, if the pre-correction target signal TC is smaller than zero (i.e. if NO) (this means that the extension-soft condition is maintained (i.e. the damping coefficient is small) (refer to the left side in FIG. 4)), since the correction for reducing the extension-hard is not required, the sub-routine of the step S81A is finished (step S202).

In the step S201, if YES (i.e. extension-hard), it is judged whether the count value $CNT_{J3R}$ is greater than the limit value $CNT_{MAX}$ (step S203). In this step S203, if it is judged that the count value $CNT_{J3R}$ is greater than the limit value $CNT_{MAX}$ (i.e. if YES), the program goes to a step S204, where it is judged whether the jerk J is greater than zero. In this step S204, if the jerk J is smaller than zero (i.e. if NO), it is judged whether the jerk J is great in comparison with the third threshold value $J_{TH3R}$ (Step S205).

In the step S204 or S205, if YES, treatments in steps S206, S207, S208 similar to the steps S203, S204, S205 are effected regarding the second counter and the second threshold value $J_{TH2R}$. In the step S207 or S208, if YES, treatments in steps S209, S210, S211 similar to the steps S203, S204, S205 are effected regarding the first counter and the first threshold value $J_{TH1R}$.

In the step S209 or S211, if NO, the control target signal C is set to ½ of the pre-correction target signal TC (i.e. C=TC/2; refer to FIG. 11) (step S212), and then, the sub-routine of the step S81A is finished. In the step S206 or S208, if NO, the control target signal C is set to ¼ of the pre-correction target signal TC (i.e. C=TC/4; refer to FIG. 11) (step S213), and then, the sub-routine of the step S81A is finished. In the step S203 or S205, if NO, the control target signal C is set to ⅛ of the pre-correction target signal TC (i.e. C=TC/8; refer to FIG. 11) (step S214), and then, the sub-routine of the step S81A is finished.

Figure 24:
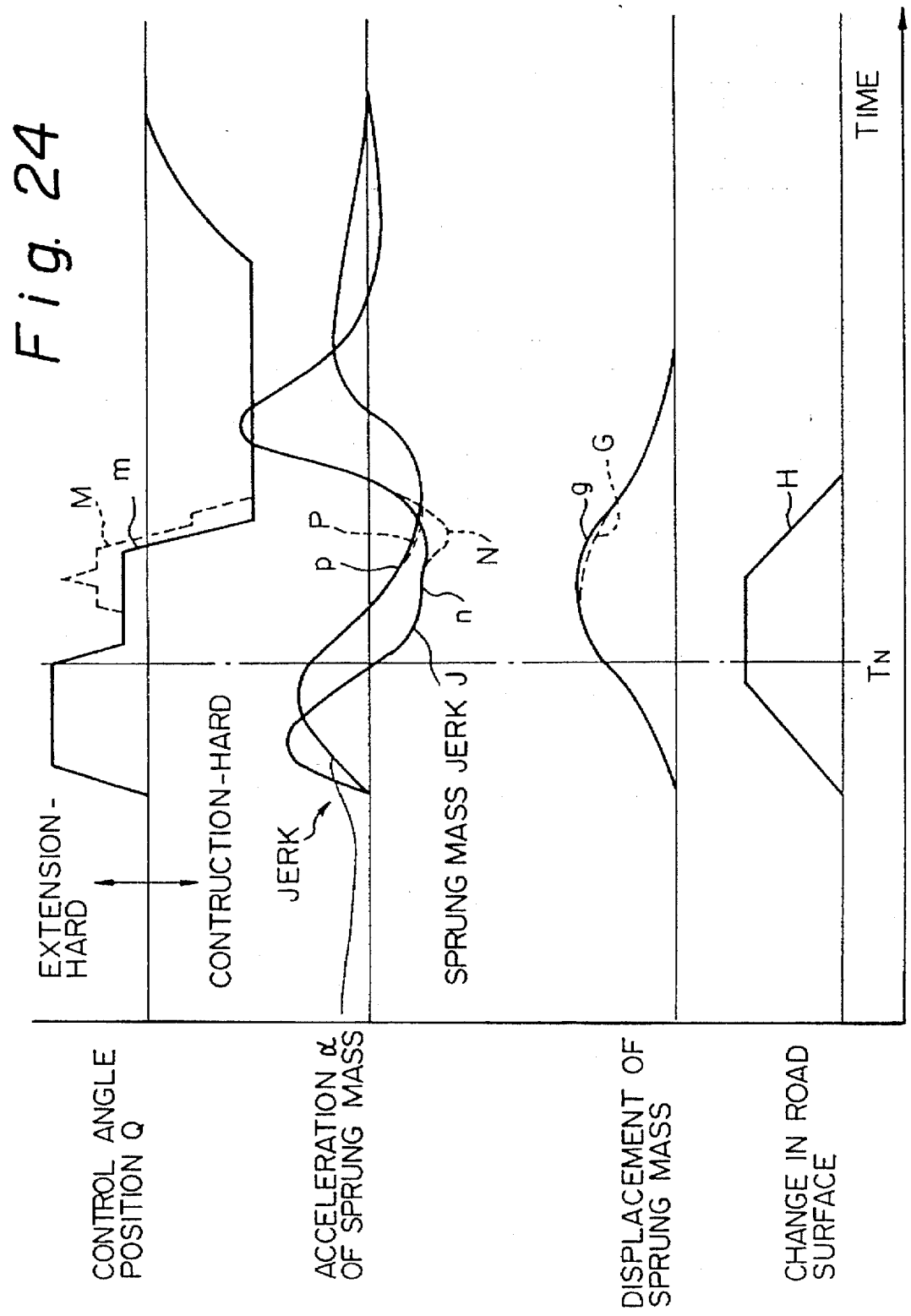
FIG. 24 is a timing chart showing various curves showing the operation of the suspension control apparatus according to the fourth embodiment.

In the suspension control apparatus according to the fourth embodiment, for example, as shown in FIG. 24, after the vehicle reaches the top of the undulation of the waving road (point $T_N$), when the jerk J of the sprung mass becomes negative and the value of the jerk exceeds the first threshold value $J_{TH1R}$, since the jerk J is great in comparison with the second and third threshold values $J_{TH2R}$, $J_{TH3R}$, it is judged as "NO" in the steps S112, S115, and, thus, the treatments in the steps S114, S117 (clear of the third and second counters) are not effected (That is to say, the count values $CNT_{J3R}$, $CNT_{J2R}$ of the third and second counters are maintained to the limit value $CNT_{MAX}$). On the other hand, since it is judged as "YES" in the steps S118, S119, the reatment in the step S120 is effected to bring the first counter to the waiting condition for the count treatment.

As mentioned above, since the count value $CNT_{J3R}$ of the third counter is maintained to the limit value $CNT_{MAX}$, it is judged as "YES" in the step S203, and, thus, the program goes to the step S204. In the step S204, since the jerk J is negative, it is judged as "NO", and, thus, the program goes to the step S205. At this point, there is a condition that the jerk has passed the first threshold value $J_{TH1R}$ (In this case, it is assumed as "jerk J>second threshold value $J_{TH2R}$"), and, accordingly, it is judged as "YES" in the step S205 to bring the program to the step S206. Similarly, (since the count value $CNT_{J2R}$ of the second counter is maintained to the limit value $CNT_{MAX}$) it is judged as "YES" in the step S206, it is judged as "NO" in the step S207 and it is judged as "YES" in the step S208, and, thus, the program goes to the step S209.

In the step S209, since the jerk J has passed the first threshold value $J_{TH1R}$ and the count value $CNT_{J1R}$ of the first counter is small in comparison with the limit value $CNT_{MAX}$, it is judged as "NO", and, thus, the program goes to the step S212, where the control target signal C is set to ½ of the pre-correction target signal TC (C=TC/2; refer to FIG. 11), thereby decreasing the damping coefficient of the extension side. The setting of the control target signal C to ½ of the pre-correction target signal TC is continued at least until the affirmative (YES) judgement is obtained in the step S209, i.e. until the time period corresponding to ¼ of the resonance period of the sprung mass has elapsed. That is to say, when the count value $CNT_{J1R}$ of the first counter is increased to reach the limit value $CNT_{MAX}$ by repeating the treatment in the step S101, it is judged as "YES" in the step S102, and the count value $CNT_{J1R}$ of the first counter is set to the limit value $CNT_{MAX}$ (step S103). As a result, it is judged as "YES" in the step S209, and, when it is judged as "YES" in the step S210 or S211, the setting is released.

When the jerk J is further decreased to pass the second threshold value $J_{TH2R}$, it is judged as "YES" in the step S203, it is judged as "NO" in the step S204 and it is judged as "YES" in the step S205, and, thus, the program goes to the step S206. In this step S206, since the jerk J has passed the second threshold value $J_{TH2R}$ and the count value $CNT_{J2R}$ of the second counter is small in comparison with the limit value $CNT_{MAX}$, it is judged as "NO", and, thus, the program goes to the step S213, where the control target signal C is set to ¼ of the pre-correction target signal TC (C=TC/4; refer to FIG. 11), thereby decreasing the damping coefficient of the extension side. The setting of the control target signal C to the ¼ of the pre-correction target signal TC is continued at least until the affirmative (YES) judgement is obtained in the step S206, i.e. until the time period corresponding to ¼ of the resonance period of the sprung mass is elapsed. That has to say, when the count value $CNT_{J2R}$ of the second counter is increased to reach the limit value $CNT_{MAX}$ by repeating the treatment in the step S101, it is judged as "YES" in the step S104, and the count value $CNT_{J2R}$ of the second counter is set to the limit value $CNT_{MAX}$ (step S105). As a result, it is judged as "YES" in the step S206, and, when it is judged as "YES" in the step S207 or S208, the setting is released.

When the jerk J is further decreased to pass the third threshold value $J_{TH3R}$, since the jerk J has passed the third threshold value $J_{TH3R}$ and the count value $CNT_{J3R}$ of the third counter is small in comparison with the limit value $CNT_{MAX}$, it is judged as "NO" in the step S203, and, thus, the program goes to the step S214, where the control target signal C is set to ⅛ of the pre-correction target signal TC (C=TC/8; refer to FIG. 11), thereby decreasing the damping coefficient of the extension side. The setting of the control target signal C to ⅛ of the pre-correction target signal TC is continued at least until the affirmative (YES) judgement is obtained in the step S203, i.e. until the time period corresponding to ¼ of the resonance period of the sprung mass has elapsed.

As mentioned above, since the extension-hard condition is weakened to ½, ¼, ⅛ when the vehicle reaches the top of the undulation of the waving road, the driver and passenger (s) do not feel as if they are thrown upwardly. If the weakening degree of the extension-hard condition is set greater, the jerk and other factors will be influenced by such setting. In this case, if the control target signal C is corrected on the basis of the value of the jerk in real time, the control target signal C will be fluctuated as if the chattering of signal occurs, with the result that the actuator is switched frequently to generate noise. However, in the illustrated embodiment of the present invention, since the extension-hard condition is gradually and sequentially weakened to ½, ¼, ⅛ and the weakened extension-hard condition is maintained for a predetermined time period, the chattering can be prevented. In usual vehicles, chattering of this kind ceases in a time which generally corresponds to ¼ of the resonance period of the sprung mass. Therefore, this embodiment is capable of suitably preventing chattering from taking place in such usual vehicles. Incidentally, in FIG. 24, the features obtained by the illustrated embodiment are indicated by curves shown by small letters g, m, n, p.

Figure 25B:
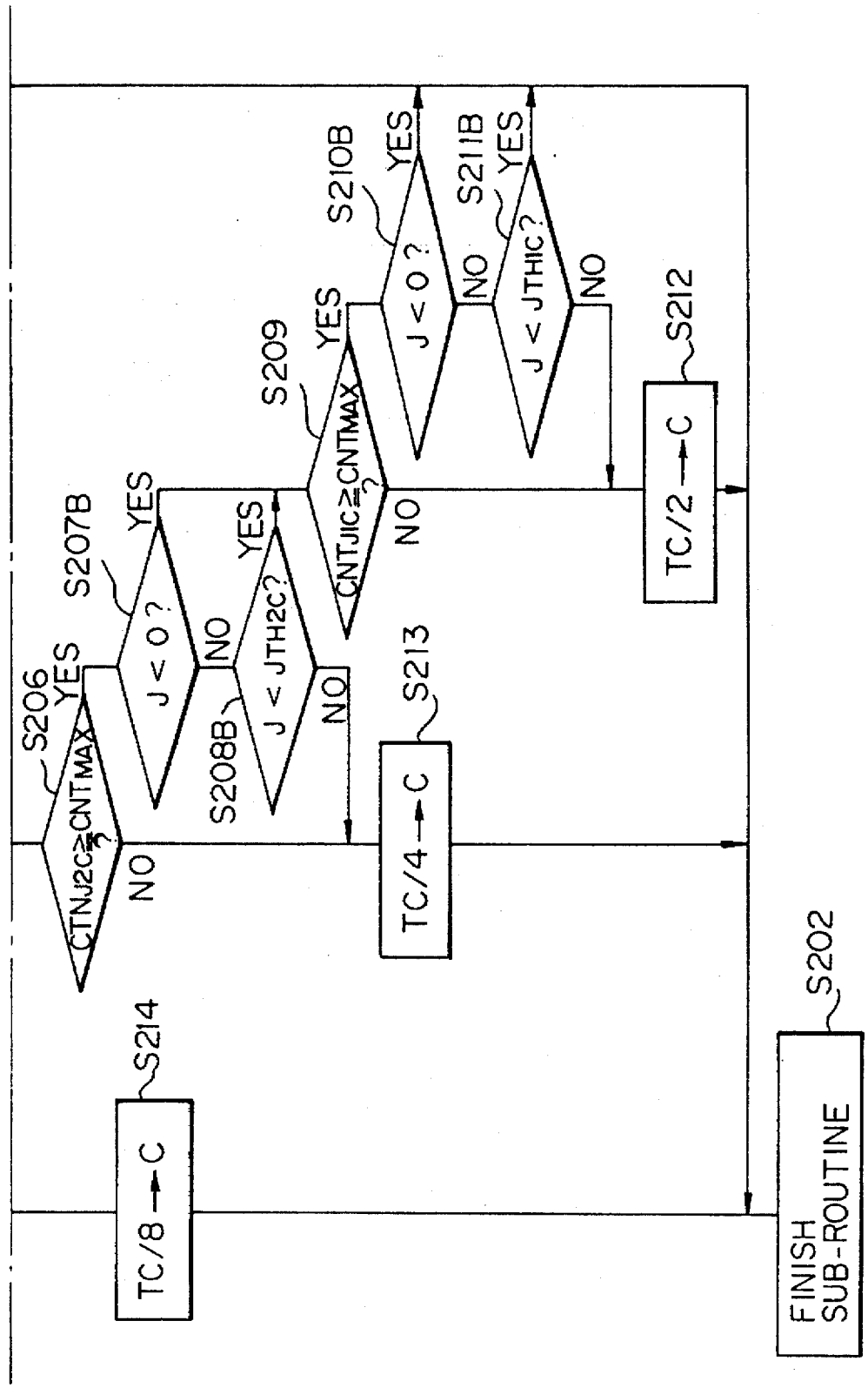
Figure 26A:
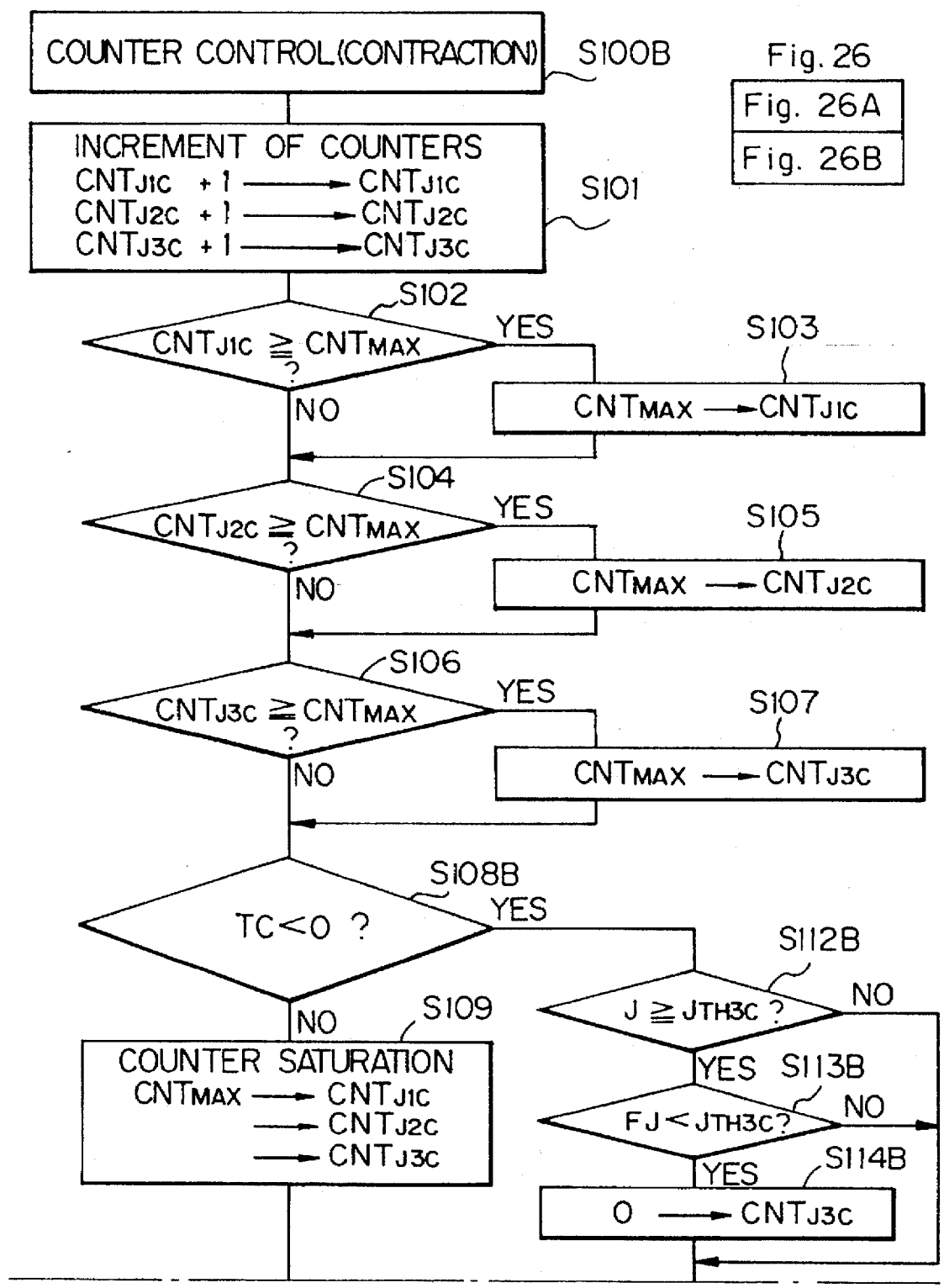
FIGS. 26A and 26B show in combination a flow chart showing a counter control treatment sub-routine in the flow chart of FIG. 25.
Figure 26B:
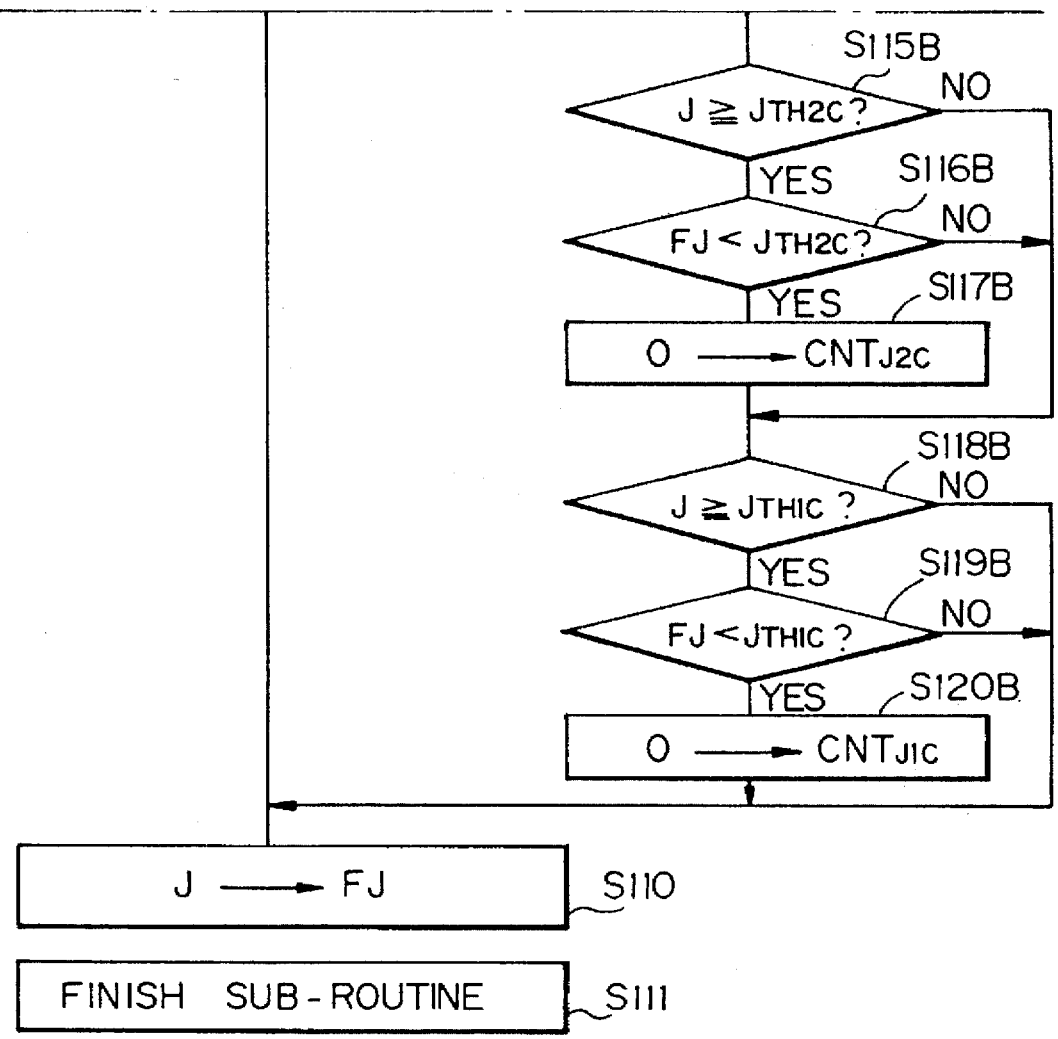

Next, a suspension control apparatus according to a fifth embodiment of the present invention will be explained with reference to FIGS. 25 to 27. This suspension control apparatus serves to eliminate the fact that the driver and passenger(s) feel bad because they feel as if they are urged against the seats strongly (referred to as "jerk of contraction side" hereinafter) due to the presence of the contraction-hard condition when the vehicle reaches the bottom of a recess of the waving road. This suspension control apparatus differs from that of the fourth embodiment in the points that first, second and third positive threshold values $J_{TH1C}$, $J_{TH2C}$, $J_{TH3C}$ ($0<J_{TH1C}<J_{TH2C}<J_{TH3C}$) (FIG. 26) are stored in the controller (in contrast, the first, second and third threshold values $J_{TH1R}$, $J_{TH2R}$, $J_{TH3R}$ in the fourth embodiments are all negative), a step S81B (for correcting the damping coefficient of the contraction side) is used in place of the step S81A of the fourth embodiment, a step S100B (for effecting counter treatment regarding the contraction side) is used in place of the step S100 of the fourth embodiment, and there are provided steps in which signs of inequality are used reversely, as will be described later.

Particularly, the controller of this fifth embodiment has a step S108B (TC<0?), a step S112B ($J \geq J_{TH3C}$?), a step S113B (FJ<$J_{TH3C}$?), a step S115B ($J \geq J_{TH2C}$?), a step S116B (FJ<$J_{TH2C}$?), a step S118B ($J \geq J_{TH1C}$?), and a step S119B (FJ<$J_{TH1C}$?) (FIG. 26) in place of the steps S108, S112, S113, S115, S116, S118 and S119 of the fourth embodiment, and further has a step S201B (TC<0?), a step S204B (J<0?), a step S205B (J<$J_{TH3C}$?), a step S207B (J<0?), a step S208B (J<$J_{TH2C}$?), a step S210B (J<0?), and a step S211B (J<$J_{TH1C}$?) in place of the steps S201, S204, S205, S207, S208, S210 and S211 of the fourth embodiment.

In the suspension control apparatus according to the fifth embodiment, for example, as shown in FIG. 27, after the vehicle reaches the bottom of the recess of the waving road (point $T_N$), when the jerk J of the sprung mass becomes positive and the value of the jerk exceeds the first threshold value $J_{TH1C}$, since the jerk J is small in comparison with the second and third threshold values $J_{TH2C}$, $J_{TH3C}$, it is judged as "NO" in the steps S112B, S115B, and, thus, the treatments in the steps S114B, S117B (clear of the third and second counters) are not effected (that is to say, the count values $CNT_{J3C}$, $CNT_{J2C}$ of the third and second counters are maintained to the limit value $CNT_{MAX}$). On the other hand, since it is judged as "YES" in the steps S118B, S119B, the treatment in the step S120 is effected to bring the first counter to the waiting condition for the count treatment.

As mentioned above, since the count value $CNT_{J3C}$ of the third counter is maintained to the limit value $CNT_{MAX}$, it is judged as "YES" in the step S203, and, thus, the program goes to the step S204B. In the step S204B, since the jerk J is positive, it is judged as "NO", and, thus, the program goes to the step S205B. At this point, there is a condition that the jerk exceeds the first threshold value $J_{TH1C}$ (In this case, it is assumed as "jerk J>second threshold value $J_{TH2C}$"), and, accordingly, it is judged as "YES" in the step S205B to bring the program to the step S206. Similarly, (since the count value $CNT_{J2C}$ of the second counter is maintained to the limit value $CNT_{MAX}$) it is judged as "YES" in the step S206, it is judged as "NO" in the step S207B and it is judged as "YES" in the step S208B, and, thus, the program goes to the step S209.

In the step S209, since the jerk J has exceeded the first threshold value $J_{TH1C}$ and the count value $CNT_{J1C}$ of the first counter is small in comparison with the limit value $CNT_{MAX}$, it is judged as "NO", and, thus, the program goes to the step S212, where the control target signal C is set to ½ of the pre-correction target signal TC (C=TC/2; refer to FIG. 11), thereby decreasing the damping coefficient of the contraction side. The setting of the control target signal C to the ½ of the pre-correction target signal TC is continued at least until the affirmative (YES) judgement is obtained in the step S209, i.e. until the time period corresponding to ¼ of the resonance period of the sprung mass has elapsed.

When the jerk J is further decreased to exceed the second threshold value $J_{TH2C}$, it is judged as "YES" in the step S203, it is judged as "NO" in the step S204B and it is judged as "YES" in the step S205B, and, thus, the program goes to the step S206. In this step S206, since the jerk J has exceeded the second threshold value $J_{TH2C}$ and the count value $CNT_{J2C}$ of the second counter is small in comparison with the limit value $CNT_{MAX}$, it is judged as "NO", and, thus, the program goes to the step S213, where the control target signal C is set to ¼ of the pre-correction target signal TC (C=TC/4; refer to FIG. 11), thereby decreasing the damping coefficient of the contraction side. The setting of the control target signal C to the ¼ of the pre-correction target signal TC is continued at least until the affirmative (YES) judgement is obtained in the step S206, i.e. until the time period corresponding to ¼ of the resonance period of the sprung mass has elapsed. That is to say, when the count value $CNT_{J2R}$ of the second counter is increased to reach the limit value $CNT_{MAX}$ by repeating the treatment in the step S101, it is judged as "YES" in the step S104, and the count value $CNT_{J2R}$ of the second counter is set to the limit value $CNT_{MAX}$ (step S105). As a result, it is judged as "YES" in the step S206, and, when it is judged as "YES" in the step S207 or S208, the setting is released.

Similarly, as is in the fourth embodiment, the setting of the control target signal C to the ¼ of the pre-correction target signal TC (C=TC/8; refer to FIG. 11) is performed.

As mentioned above, since the contraction-hard condition is weakened to ½, ¼, ⅛ when the vehicle reaches the bottom of the recess of the waving road, the driver and passenger(s) do not feel as if they are urged against the seats strongly. If the weakening degree of the contraction-hard condition is set greater, the jerk J and other factors are influenced by such setting. In this case, if the control target signal C is corrected on the basis of the value of the jerk in real time, the control target signal C will be fluctuated as if the chattering of signal occurs, with the result that the actuator is switched frequently to generate noise. However, in the illustrated embodiment of the present invention, since the contraction-hard condition is gradually and sequentially weakened to ½, ¼, ⅛ and the weakened contraction-hard condition is maintained for a predetermined time period, the chattering can be prevented. Incidentally, in FIG. 27, the features obtained by the illustrated embodiment are indicated by curves shown by small letters g, m, n, p.

Figure 21:
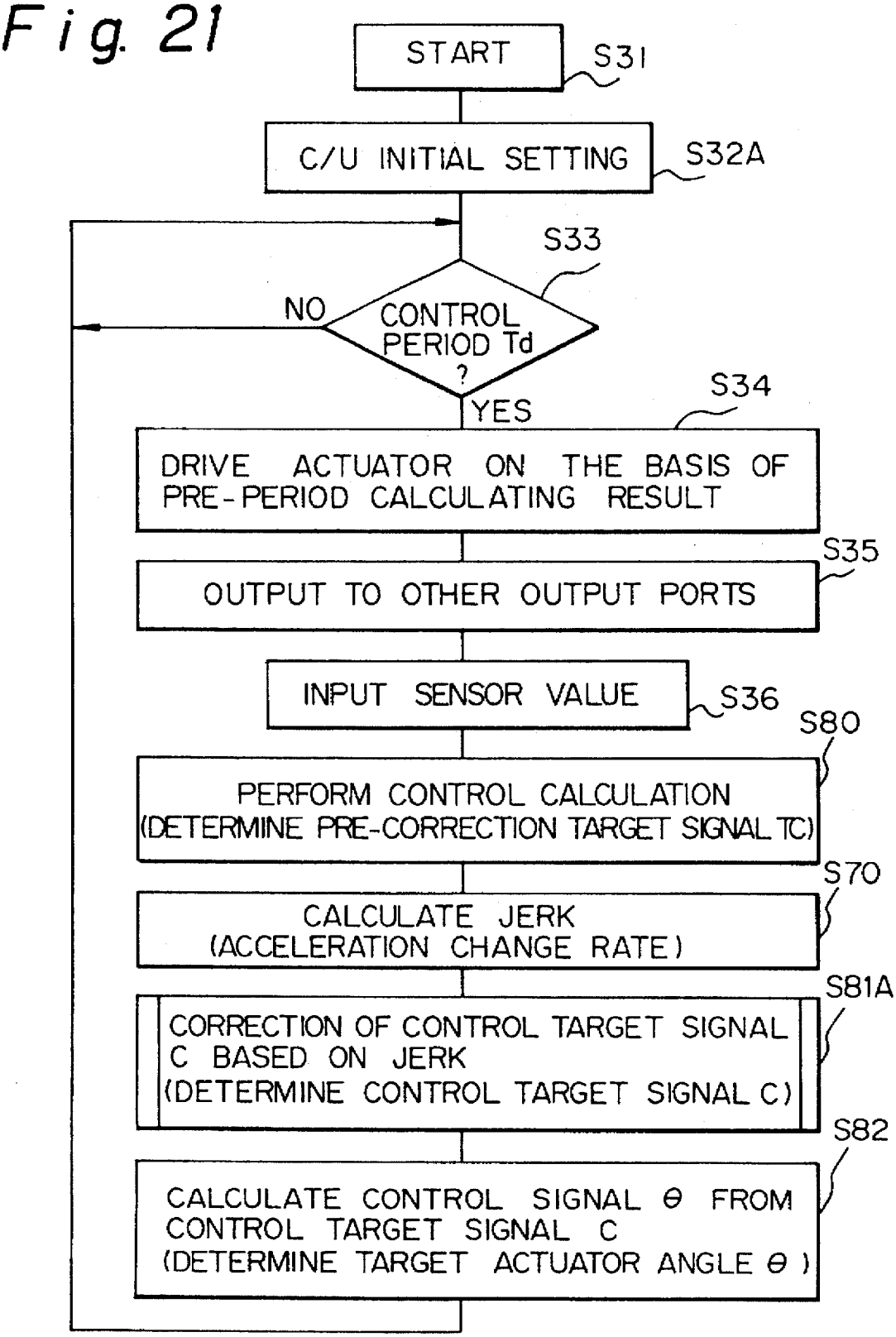
FIG. 21 is a flow chart of the operation of a controller of a suspension control apparatus according to a fourth embodiment of the present invention.
Figure 28B:
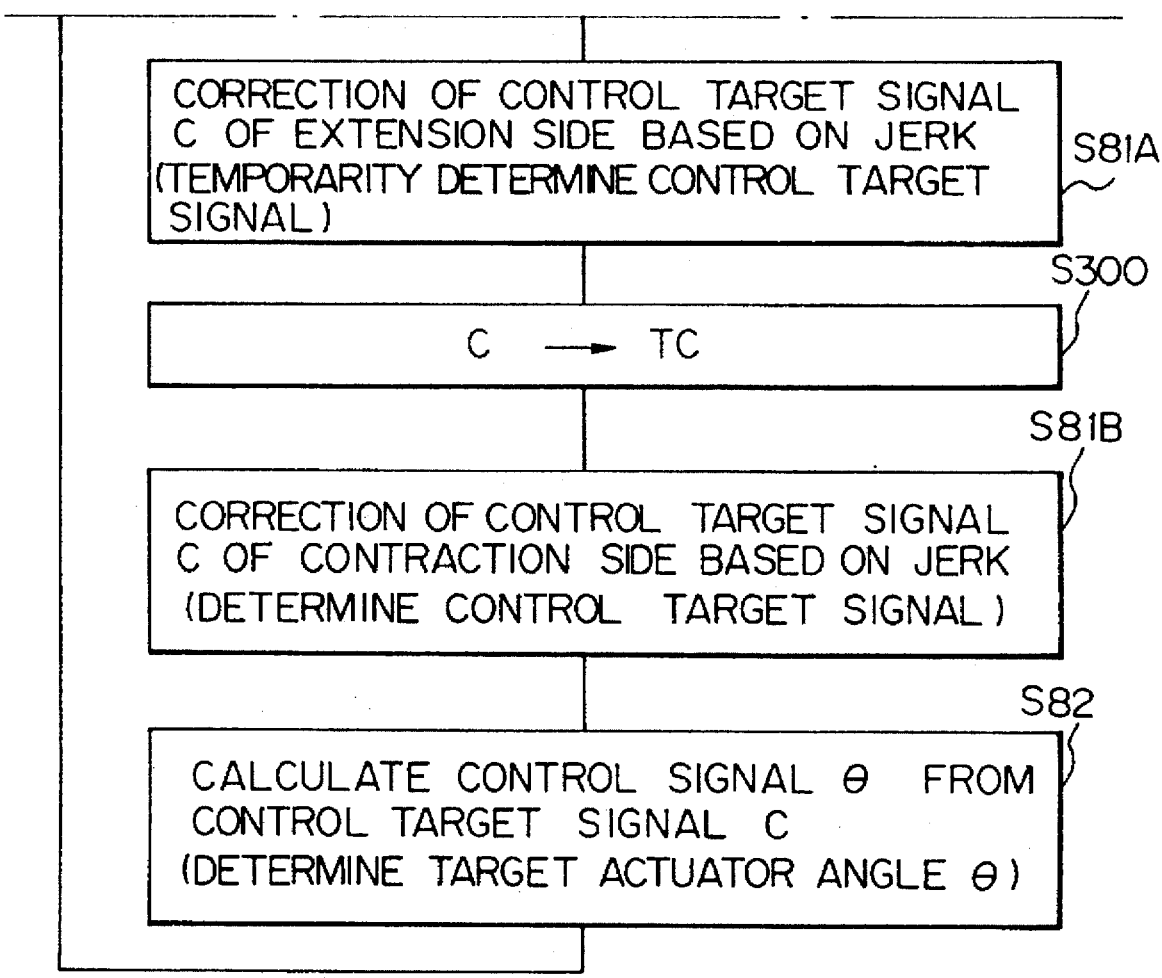

Next, a sixth embodiment will be explained with reference to FIG. 28, while sometimes referring to FIGS. 18, 22, 23, 25 and 26. A controller according to this sixth embodiment serves to eliminate the fact that the driver and passenger(s) feel bad by improving both of the jerk of the extension side and the jerk of the contraction side. As shown in FIG. 28, the controller of the sixth embodiment has a step S81A (FIG. 22), a step S300 and a step S81B (FIG. 25) in place of the step S81A (FIGS. 21 and 22). Incidentally, in the step S81A, the control target signal C is temporarily determined. In the next step S300, the control target signal C temporarily determined in the step S81A is redefined as the pre-correction target signal TC. After the treatment in the step S300 is effected, the step S81B explained in connection with FIG. 25 is carried out.

Since the sixth embodiment has both the functions of the fourth embodiment and of the fifth embodiment, the fact that the driver and passenger(s) feel as if they are thrown out upwardly is eliminated by gradually weakening the extension-hard condition when the vehicle reaches the top of the undulation of the weaving road, and the fact that the driver and passenger(s) feel as if they are urged against the seats strongly is eliminated by gradually weakening the contraction-hard condition when the vehicle reaches the bottom of the recess of the waving road. Further, since the extension-hard condition and the contraction-hard condition are gradually and sequentially weakened to ½, ¼, ⅛ and the weakened extension-hard or contraction-hard condition is maintained for the predetermined time period, the above-mentioned chattering can be prevented.

In the fourth to sixth embodiments, while an example that the time period corresponding to ¼ of the resonance period of the sprung mass is set as the predetermined time period is explained, the predetermined time period is not limited to such an example, but may be set to ⅓ or ⅕ of the resonance period of the sprung mass depending on the feature of the vehicle.

Figure 29A:
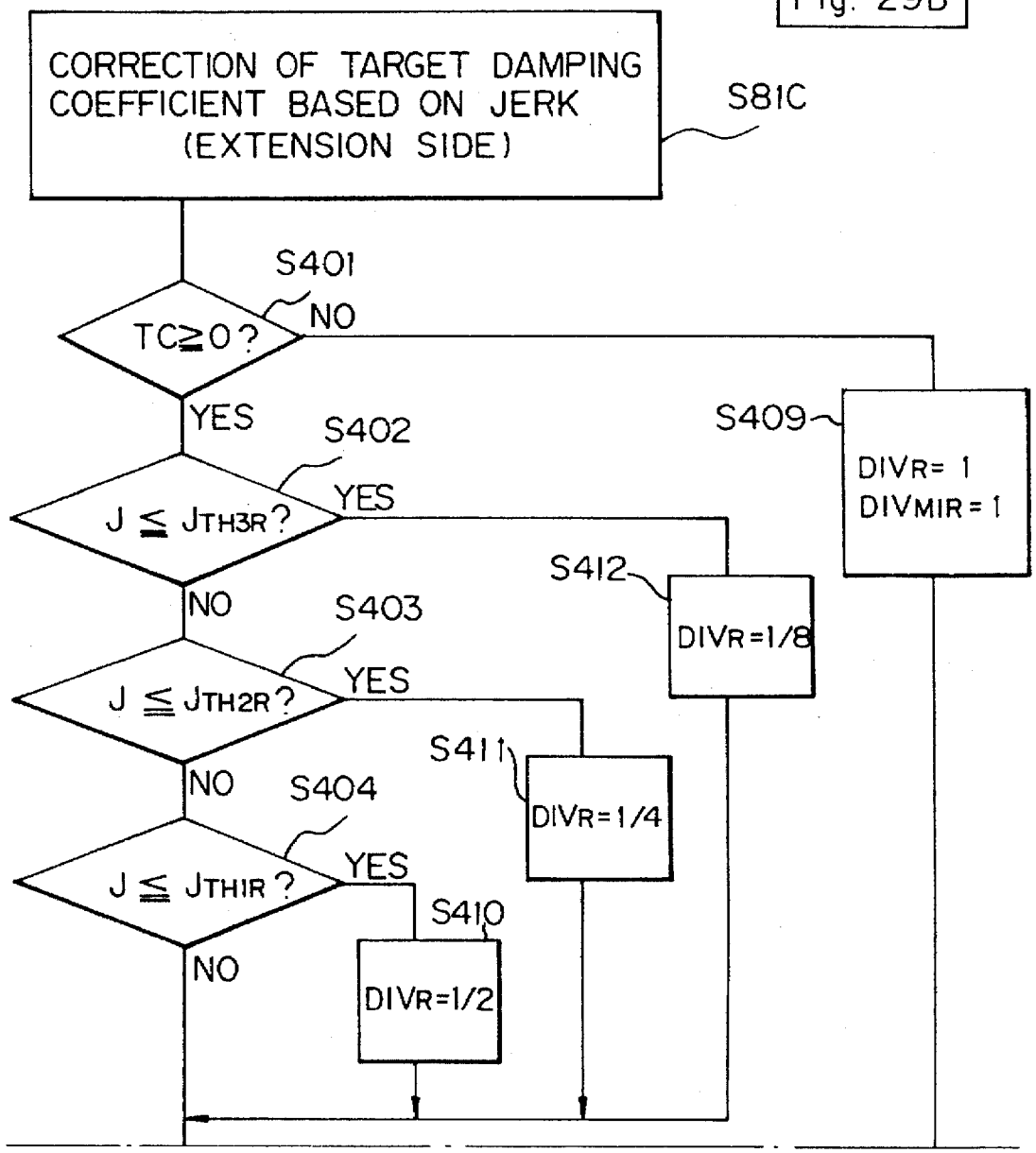
FIGS. 29A and 29B show in combination a flow chart showing a control target signal determining sub-routine according to a seventh embodiment of the present invention.
Figure 29B:
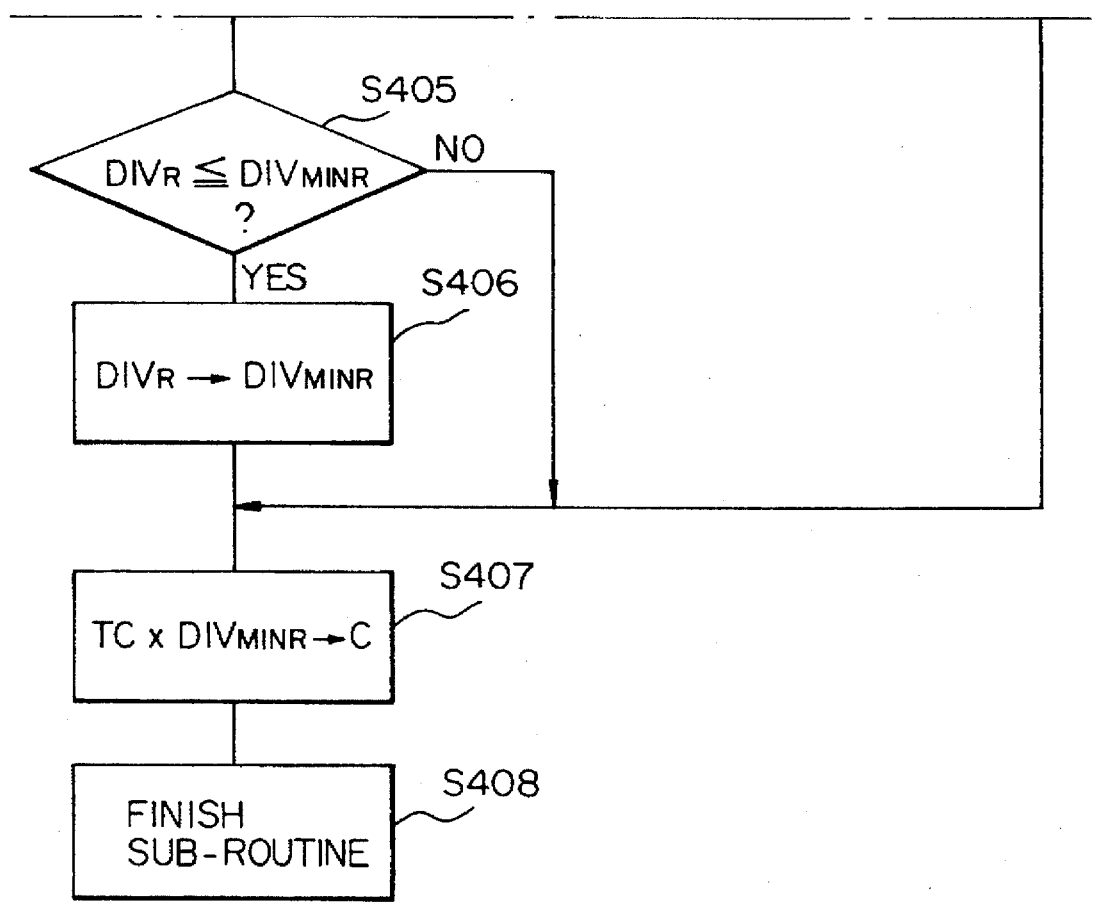

Next, a suspension control apparatus according to a seventh embodiment of the present invention will be explained with reference to FIG. 29, while sometimes referring to FIGS. 11 and 21. The suspension control apparatus serves to eliminate the fact that the driver and passenger(s) feel bad by improving the jerk of the extension side, and a controller of the suspension control apparatus has a step S81C (FIG. 29) in place of the step S81A (FIG. 21) of the fourth embodiment.

The seventh embodiment is characterized in that the damping coefficient weakened to ½, ¼ or ⅛ is maintained until the direction of the upward or downward absolute velocity of the sprung mass is changed, i.e. the pre-correction target signal TC becomes greater than zero (in place of the predetermined time period of the fourth embodiment).

According to the controller of this embodiment, in the sub-routine of the step S81C, first of all, it is judged whether the value of the pre-correction target signal TC is equal to or greater than zero (step S401). In this step S401, if YES, judgement whether the jerk J is smaller than the third threshold value $J_{TH3R}$ (step S402), judgement whether the jerk J is smaller than the second threshold value (step S403) and judgement whether the jerk J is smaller than the first threshold value $J_{TH1R}$ (step S404) are successively effected ($0 > J_{TH1R} > J_{TH2R} > J_{TH3R}$).

In the step S404, if NO, the program goes to a step S405, where it is judged whether a correction coefficient $DIV_R$ of the extension side representative of ½, ¼ or ⅛ (described later) is smaller than a minimum correction coefficient $DIV_{MINR}$ representative of a minimum value after TC≧0. In the step S405, if YES, renewal of the minimum correction coefficient $DIV_{MINR}$ is effected (step S406). Then, in a step S407, the control target signal C is obtained by multiplying the pre-correction target signal TC by the minimum correction coefficient $DIV_{MINR}$. Then, the sub-routine is finished (step S408).

In the step S401, if NO, the correction coefficient $DIV_R$ of the extension side and the minimum correction coefficient $DIV_{MINR}$ are set to 1 (step S409), and then, the program goes to the step S407.

In the step S404, if YES, the correction coefficient $DIV_R$ of the extension side is set to ½ (step S410), and then, the program goes to the step S405. In the step S403, if YES, the correction coefficient $DIV_R$ of the extension side is set to ¼ (step S411), and then, the program goes to the step S405. In the step S402, if YES, the correction coefficient $DIV_R$ of the extension side is set to ⅛ (step S412), and then, the program goes to the step S405. The values set in the steps S410, S411, S412 are stored in a memory (not shown) for use in the judgement in the step S405.

In the suspension control apparatus according to the seventh embodiment, in the condition that the pre-correction target signal TC is negative, i.e. the extension-soft condition, it is judged as "NO" in the step S401, and the correction coefficient $DIV_R$ of the extension side and the minimum correction coefficient $DIV_{MINR}$ are set to 1 (step S409), and then, the program goes to the step S407, where the value obtained multiplying the pre-correction target signal TC by 1 (i.e. pre-correction target signal TC itself) is set as the control target signal C (refer to FIG. 11).

After the vehicle reaches the top of the undulation of the waving road, when the jerk J of the sprung mass becomes negative and the value of the jerk becomes smaller than the first threshold value $J_{TH1R}$, since the jerk J is greater than the second and third threshold values $J_{TH2R}$, $J_{TH3R}$, it is judged as "NO" in the steps S402, S403, and, thus, the program goes to the step S404. And, it is judged as "YES" in the step S404, and the correction coefficient $DIV_R$ of the extension side is set to ½ in the step S410. At this point, since ½ of the correction coefficient $DIV_R$ of the extension side is a minimum value, the minimum correction coefficient $DIV_{MINR}$ is renewed to ½ in the step S406. Then, in the step S407, the value obtained by multiplying the pre-correction target signal TC by ½ is used as the control target signal C. In this way, the damping coefficient of extension side is reduced, thereby improving the jerk of extension side.

When the jerk is further decreased to exceed the second threshold value $J_{TH2R}$, it is judged as "YES" in the step S403, and the correction coefficient $DIV_R$ of the extension side is set to ¼ (step S411). At this point, since ¼ of the correction coefficient $DIV_R$ of the extension side is a minimum value, the minimum correction coefficient $DIV_{MINR}$ is renewed to ¼ in the step S406. Then, in the step S407, the value obtained by multiplying the pre-correction target signal TC by ¼ is used as the control target signal C. In this way, the damping coefficient of extension side is further reduced, thereby further improving the jerk of extension side.

When the jerk is further decreased to exceed the third threshold value $J_{TH3R}$, it is judged as "YES" in the step S402, and the correction coefficient $DIV_R$ of the extension side is set to ⅛ (step S412). At this point, since ⅛ of the correction coefficient $DIV_R$ of the extension side is a minimum value, the minimum correction coefficient $DIV_{MINR}$ is renewed to ⅛ in the step S406. Then, in the step S407, the value obtained by multiplying the pre-correction target signal TC by ⅛ is used as the control target signal C. In this way, the damping coefficient of extension side is further reduced, thereby further improving the jerk of extension side.

Figure 30A:
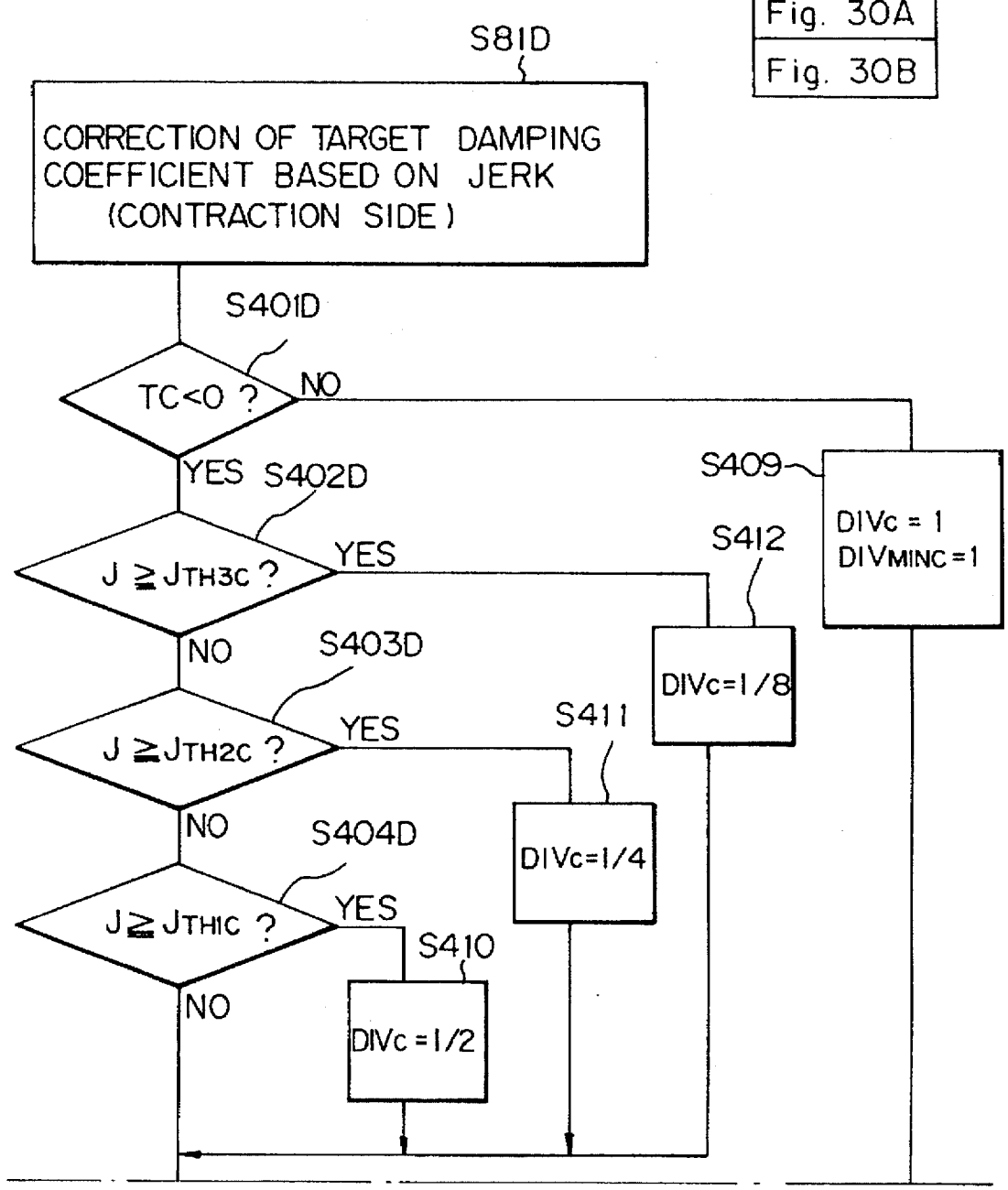
FIGS. 30A and 30B show in combination a flow chart showing a control target signal determining sub-routine according to an eighth embodiment of the present invention.
Figure 30B:
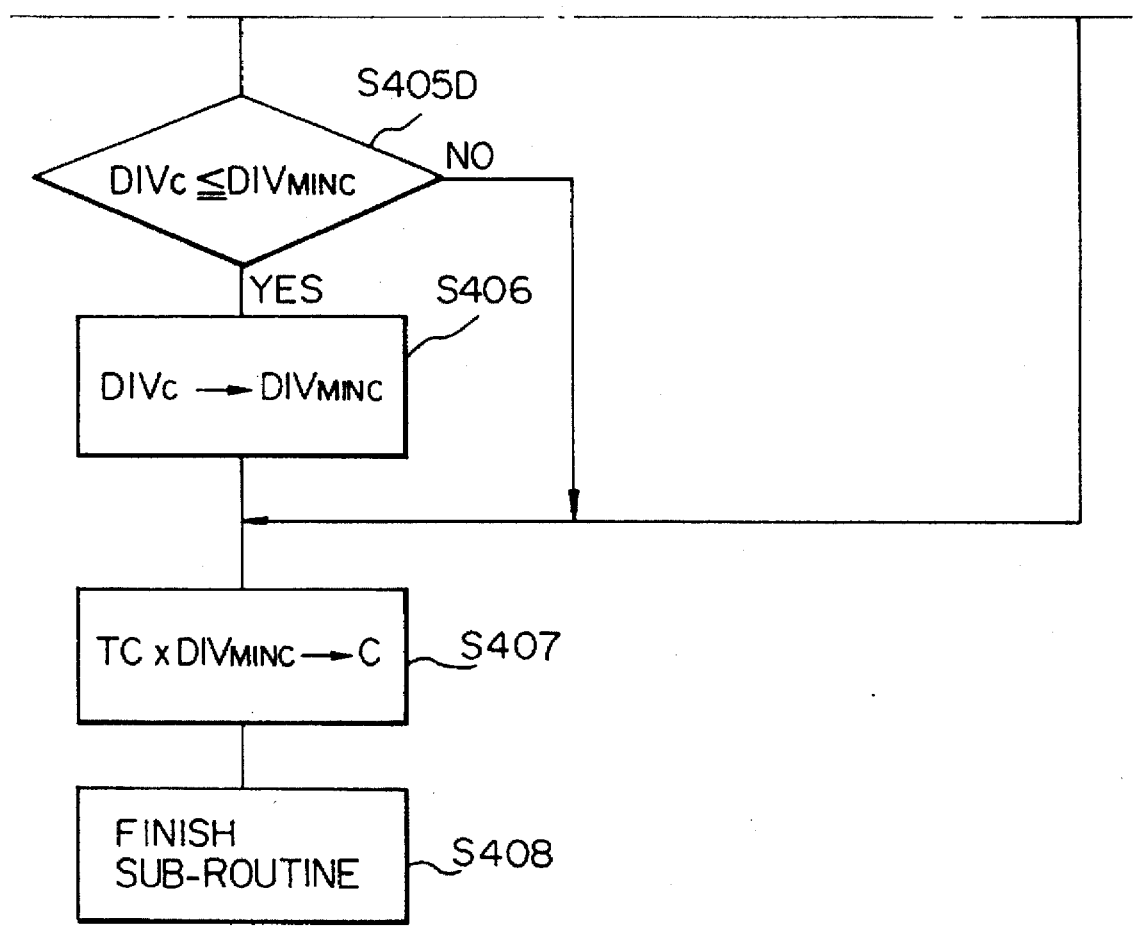

Next, an eighth embodiment of the present invention will be explained with reference to FIG. 30, while sometimes referring to FIG. 29. A suspension control apparatus according to this eighth embodiment serves to eliminate the fact that the driver and passenger(s) feel bad by improving the jerk of the contraction side. This suspension control apparatus differs from that of the seventh embodiment in the points that first, second and third positive threshold values $J_{TH1C}$, $J_{TH2C}$, $J_{TH3C}$ ($0 < J_{TH1C} < J_{TH2C} < J_{TH3C}$) are stored in the controller (in place of the first, second and third threshold values $J_{TH1R}$, $J_{TH2R}$, $J_{TH3R}$ in the seventh embodiments), a step S81D (for correcting the damping coefficient of contraction side) is used in place of the step S81C of the seventh embodiment, and there are provided steps in which signs of inequality are used reversely as will be described later.

That is to say, the controller according to the eighth embodiment has a step S401D (TC<0?), a step S402D (J>$J_{TH3C}$?), a step S403D (J>$J_{TH2C}$?), a step S404D (J>$J_{TH1C}$?), and a step S405D ($DIV_R \leq DIV_{MAX}$?) in place of the steps S401–S405 of the seventh embodiment.

In the suspension control apparatus according to the eighth embodiment, since the contraction-hard is weakened to ½, ¼, ⅛ when the vehicle reaches the bottom of the recess of the waving road, the driver and passenger(s) do not feel to be urged against the seats strongly. If the weakening degree of the contraction-hard is set greater, the jerk J and other factors will be influenced by such setting. In this case, if the control target signal C is corrected on the basis of the value of the jerk in real time, the control target signal C will be fluctuated as if the chattering of signal occurs. However, in the illustrated embodiment of the present invention, since the contraction-hard is gradually and sequentially weakened to ½, ¼, ⅛, the chattering can be prevented.

Incidentally, as is in the sixth embodiment, by combining the seventh embodiment and the eighth embodiment, both the jerk of extension side and the jerk of contraction side may be simultaneously be improved.

In the above-mentioned fourth to eighth embodiments, while an example that the control target signal C is corrected on the basis of the jerk (steps S81A–S81D) is explained, the correction of the control signal θ based on the jerk in the step S71 in FIG. 14 may be carried out by using the concepts of the fourth to eighth embodiments. In this case, in various steps, "θ" may be used in place of "C".

What is claimed is:

1. A suspension control device, comprising:

a shock absorber which can be controlled to have a variable damping coefficient, said shock absorber being disposed between a sprung mass and an unsprung mass of a vehicle;

an actuator for adjusting the damping coefficient of said shock absorber;

an acceleration detecting device for detecting vertical acceleration of the sprung mass of the vehicle; and a control device for outputting a control signal to said actuator for setting the damping coefficient, wherein said control device receives the detected value of the vertical acceleration;

wherein said control device comprises a velocity determining means for determining the vertical velocity of the sprung mass from the value of the detected vertical acceleration, and a control signal calculating device for calculating the control signal on the basis of the value of the determined vertical velocity, where said control means further includes control signal adjusting means for changing the control signal based on the vertical velocity such that the damping coefficient of said shock absorber is decreased if the absolute value of the vertical acceleration exceeds an acceleration reference value.

2. A suspension control device, comprising:

a shock absorber which can be controlled to have a variable damping coefficient, said shock absorber being disposed between a sprung mass and an unsprung mass of a vehicle;

an actuator for adjusting the damping coefficient of said shock absorber;

an acceleration detecting device for detecting a vertical acceleration of the sprung mass of the vehicle;

a controlling device for outputting a control signal to said actuator for setting the damping coefficient, wherein said controlling device receives the detected value of the vertical acceleration;

wherein said controlling device comprises a velocity determining means for determining the vertical velocity of the sprung mass from the value of the detected vertical acceleration, and a control signal calculating device for calculating the control signal on the basis of the value of the determined vertical velocity, where said control means further includes a differentiating device for differentiating the value of the vertical acceleration and a control signal adjusting means for adjusting the control signal based on the vertical velocity such that the damping coefficient of said shock absorber is decreased if the absolute value of the differentiated vertical acceleration exceeds a reference value.

3. A suspension control apparatus according to claim 1 or 2, wherein said velocity determining means determines upward absolute velocity and downward absolute velocity of the sprung mass, and wherein said controlling device sends the control signal so that the damping coefficient for the extension side is increased as the absolute velocity is increased when the absolute velocity is directed upwardly and the damping coefficient for the contraction side is increased as the absolute value of the absolute velocity is increased downwardly.

4. A suspension control apparatus according to claim 2, wherein said control signal adjusting means outputs the control signal to maintain a condition such that the damping coefficient of said actuator has a relatively small value for a predetermined time period when the acceleration change rate exceeds the predetermined acceleration change rate reference value.

5. A suspension control apparatus according to claim 4, wherein the predetermined time period is a time period which is ¼ of the resonance period of the sprung mass.

6. A suspension control apparatus according to claim 2, wherein said velocity determining means determines upward absolute velocity and downward absolute velocity of the sprung mass, and wherein said control signal adjusting means outputs the control signal to maintain a condition such that the damping coefficient of said actuator has a relatively small value until the direction of the absolute velocity changes, when the acceleration change rate exceeds the predetermined acceleration change rate reference value.

* * * * *